(12) United States Patent
Nikovski et al.

(10) Patent No.: US 11,518,646 B2
(45) Date of Patent: Dec. 6, 2022

(54) METHOD AND SYSTEM FOR TOUCHLESS ELEVATOR CONTROL

(71) Applicant: Mitsubishi Electric Research Laboratories, Inc., Cambridge, MA (US)

(72) Inventors: Daniel Nikovski, Cambridge, MA (US); William Yerazunis, Acton, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 278 days.

(21) Appl. No.: 16/885,777

(22) Filed: May 28, 2020

(65) Prior Publication Data
US 2021/0371234 A1   Dec. 2, 2021

(51) Int. Cl.
| | |
|---|---|
| *B66B 1/46* | (2006.01) |
| *G06F 3/0484* | (2022.01) |
| *G06T 7/50* | (2017.01) |
| *G06T 7/73* | (2017.01) |
| *H04N 5/33* | (2006.01) |

(52) U.S. Cl.
CPC ........... *B66B 1/468* (2013.01); *G06F 3/0484* (2013.01); *G06T 7/50* (2017.01); *G06T 7/73* (2017.01); *H04N 5/33* (2013.01); *B66B 2201/101* (2013.01); *B66B 2201/103* (2013.01); *B66B 2201/4615* (2013.01); *B66B 2201/4638* (2013.01); *G06T 2207/10024* (2013.01); *G06T 2207/10028* (2013.01); *G06T 2207/10048* (2013.01); *G06T 2207/30196* (2013.01)

(58) Field of Classification Search
CPC .................. G06F 3/0484; B66B 1/468; B66B 2201/4638
See application file for complete search history.

(56) References Cited

U.S. PATENT DOCUMENTS

| | | | |
|---|---|---|---|
| 10,023,427 B2 | 7/2018 | Scoville | |
| 10,320,384 B2 | 6/2019 | Lohbihler et al. | |
| 2012/0326959 A1* | 12/2012 | Murthi | G06F 3/005 382/173 |
| 2015/0090536 A1 | 4/2015 | Chen | |
| 2017/0144859 A1* | 5/2017 | Scoville | G06F 3/017 |
| 2017/0212600 A1 | 7/2017 | Koukoumidis | |
| 2017/0228034 A1* | 8/2017 | Hollar | G06Q 30/0241 |

* cited by examiner

*Primary Examiner* — Matthew Salvucci
(74) *Attorney, Agent, or Firm* — Gennadiy Vinokur; Hironori Tsukamoto

(57) ABSTRACT

A control system for controlling an operation of an elevator arranged to service different floors of a building, is disclosed. The control system comprises an input interface configured to receive a measurement of a distance metric to an object located at a service floor in a line-of-sight of a sensor; an output interface configured to cause a display device to display a floor value indicating a destination floor; and a processor configured to compare the received distance metric with a referenced distance metric to estimate a sign of the comparison and a value of the comparison; repeatedly update, until a termination condition is met, the floor value displayed on the display device in a direction of the elevator service indicated by the sign and with a frequency of the update indicated by the value; and cause the elevator to perform the service operation from the service floor to the destination floor.

19 Claims, 21 Drawing Sheets

| RECEIVED DISTANCE (cm) | REFERENCED DISTANCE (cm) | COMPARISON (cm) | SIGN | DIRECTION |
|---|---|---|---|---|
| 10 | 5 | 10>5 | +VE | UPWARD |
| 3 | 5 | 3<5 | -VE | DOWNWARD |

Figure 3A

| RECEIVED DISTANCE (cm) | REFERENCE DISTANCE (cm) | COMPARISON | VALUE | FREQUENCY OF UPDATE |
|---|---|---|---|---|
| 10 | 5 | 10>5 | 5 | 5 |
| 3 | 5 | 3<5 | 2 | 2 |

Figure 3B

| RECEIVED DISTANCE (cm) | REFERENCE DISTANCE (cm) | DIFFERENCE (cm) | TH (cm) | T (SECS) | TERMINATION CONDITION |
|---|---|---|---|---|---|
| 10 | 5 | 10 - 5 = 5 | 10 | 5 SECS | TRUE |

Figure 3C

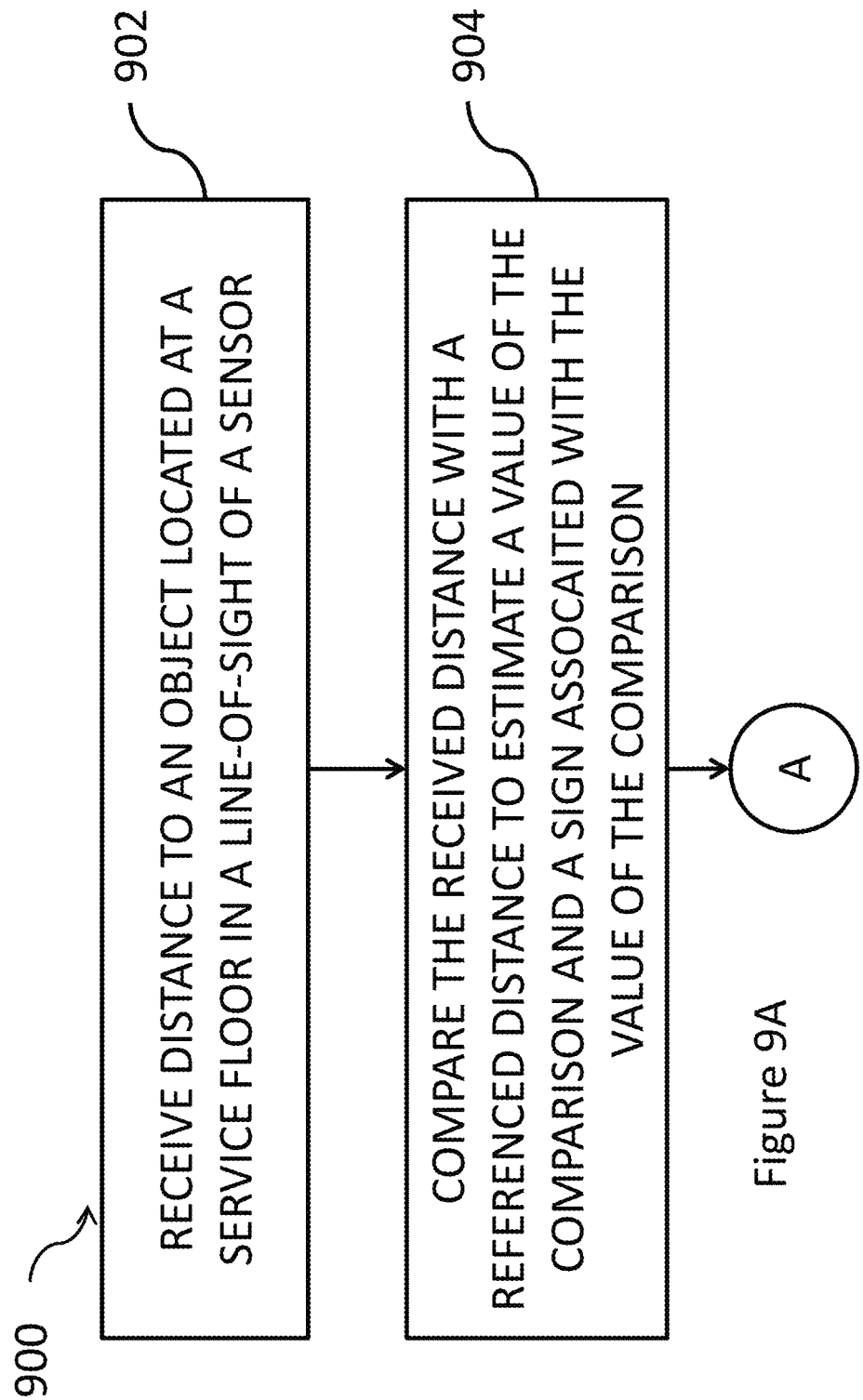

METHOD AND SYSTEM FOR TOUCHLESS ELEVATOR CONTROL

TECHNICAL FIELD

The present disclosure generally relates to vertical transport technology, and more specifically to a method and system for controlling an operation of an elevator arranged to service different floors of a building.

BACKGROUND

Nowadays, elevators are commonly used in offices and residential buildings. Typically, an elevator is controlled through physical contact, such as touching or pressing control buttons to operate the elevator. The control buttons may correspond to the desired direction of travel or directly the desired destination floor. Such physical contact on the control buttons by several users may leave millions of micro-organisms on the surface of the control buttons. In some cases, the micro-organisms may include bacteria or viruses that may cause spreading of contagious diseases. To overcome such problems, contactless inputs are introduced in many systems to control the elevators. The contactless inputs include gesture-based inputs, voice command-based inputs, and the like.

However, processing the voice command-based inputs or gesture-based inputs needed to control the elevators is complex. Such input methods require significant computational and communication infrastructure, with associated costs and installation time. Further, the voice command based inputs fail in case a user is unaware of the language accepted by a system to recognize the voice command based inputs. Also, the voice command based inputs may not be correctly recognized by the system due to different accents of users, which may result in inefficient operation of the elevators. Further, in case of gesture based inputs, the user is required to be aware of the gestures acceptable by the system to control the elevators. Due to such limitations, the current systems are rendered inefficient which leads to inconvenience of the users of the elevators.

Accordingly, there is a need of a system for operating the elevator with contactless inputs of the elevators in an efficient and feasible manner.

SUMMARY

Some embodiments are based on the recognition that movement of an elevator may be controlled through contactless inputs. To that end, it is an objective of some embodiments to provide a control system and a method for computing contactless inputs to control the elevator in a contactless manner.

Some embodiments are based on the recognition that a sensor configured to receive a contactless user input can be utilized to control the elevator. Such sensor measures a distance metric to an object (such as a hand of a user). To that end, the hand is positioned at a line-of-sight of the sensor and the distance metric from the sensor to the hand is measured. The measured distance metric is compared against a referenced distance metric, where the referenced distance metric is in the line-of-sight of the sensor. In some embodiments, the referenced distance metric may be indicated as a baseline within a specific range of the sensor. In some other embodiments, the referenced distance metric may correspond to an initial position of the hand detected by the sensor. As used herein, distance metric is data indicative of a distance between a sensor or group of sensors to an object. Examples of distance metric include measurements of the distance, temperature of the object that depends on the distance to the object, and the like.

Further, it is an objective of some embodiments to display a service floor in a display device based on a value of the comparison. A frequency of update is determined based on the value of the comparison. In some embodiments, the frequency of update is proportional to the value of the comparison. Also, in case the value of the comparison is below a distance threshold, the frequency of update is zero. The frequency of update is proportional to the value of comparison, i.e. difference between the measured distance metric and the referenced distance metric. Further, a direction of elevator service is determined based on the sign of the value of the comparison. The direction may be indicated as an upward direction or a downward direction of the elevator service.

In some embodiments, the displayed floor value is repeatedly updated, until a termination condition is satisfied. The termination condition is satisfied when the value of the comparison is below a distance threshold for a period of time greater than a threshold time period.

In some embodiments, floor values of the building may be associated with floors of the building. Additionally, or alternatively, the floor values may include a sequence of whole numbers and smaller values of the whole numbers may correspond to lower floor values of the floor values. The numbers may increase or decrease upon the update of the displayed floor values.

Additionally or alternatively, the user may change destination floor by moving the object, i.e. the hand of the user within the line-of-sight of the sensor. To that end, the line-of-sight of the sensor may be in a vertical direction allowing the user to change the destination floor by moving the hand up or down. In some other embodiments, the line-of-sight of the sensor may be in a horizontal direction allowing the user to change the destination floor by moving the hand backward or forward, or combination thereof.

In some cases, commonly used floors of the building may be indicated on the display device based on the value of the comparison. In some example embodiments, when a sign of the value of the comparison is negative and the value of the comparison is above a predetermined threshold, the lowest floor that is commonly used, such as a ground floor or a street floor is indicated on the display device. When the sign of the value of the comparison is positive and the value of the comparison is above the predetermined threshold, a top floor of the building, such as a penthouse is indicated on the display device.

In some embodiments, the sensor may include an infrared (IR) sensor, such as a passive IR (PIR) sensor that may be configured to measure radiant heat emitted by or reflected from the object. The measured radiant heat may be used to determine a distance to the object from the PIR sensor. Additionally, or alternatively, the PIR sensor may comprise a pair of PIR sensors mounted at an angle and pointed towards the object. Each PIR sensor of the pair of PIR sensors may capture a thermal image of the object from corresponding angle of the PIR sensors. In both the thermal images, a centroid of image pixels may be computed whose values are above a predefined threshold. A difference between the respective positions of the objects in the two thermal images may be used to compute a distance of the object from the pair of PIR sensors. The computed distance may be compared against the referenced distance metric, and display destination floor based on the comparison. Additionally or alternatively, the sensor may include a camera, such as a Red Green Blue-Depth (RGBD) camera that measures a depth map of the object in front of the RGBD camera.

Accordingly, one embodiment discloses a control system for controlling an operation of an elevator arranged to service different floors of a building. The control system comprises an input interface, an output interface and a processor. The input interface is configured to receive a measurement of a distance metric to an object located at a service floor in a line-of-sight of a sensor. The output interface is configured to cause a display device to display a floor value indicating a destination floor. The processor is configured to compare the received distance metric with a referenced distance metric to estimate a sign of the comparison and a value of the comparison. The processor is also configured to repeatedly update, until a termination condition is met, the floor value displayed on the display device in a direction of the elevator service indicated by the sign of the comparison and with a frequency of the update indicated by the value of the comparison. The processor is further configured to cause the elevator to perform the service operation from the service floor to the destination floor indicated by the floor value displayed upon meeting the termination condition.

Another embodiment discloses a method for controlling an operation of an elevator arranged to service passengers to different floors of a building. The method uses a processor coupled with stored instructions implementing the method. The instructions, when executed by the processor carry out steps of the method. The method includes receiving a measurement of a distance metric to an object located at a service floor in a line-of-sight of a sensor. The method includes comparing the received distance with a referenced distance metric to estimate a sign of the comparison and a value of the comparison. The method also includes repeatedly updating, until a termination condition is met, the floor value displayed on the display device in a direction of the elevator service indicated by the sign of the comparison and with a frequency of the update indicated by the value of the comparison. The method further includes causing the elevator to perform the service operation from the service floor to the destination floor indicated by the floor value displayed upon meeting the termination condition.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 3A shows a tabular representation depicting direction of elevator service, according to one example embodiment of the present disclosure.

FIG. 3B shows a tabular representation depicting update changes regarding floor value displayed on a display device, according to one example embodiment of the present disclosure.

FIG. 3C shows a tabular representation depicting termination condition for the elevator service, according to one example embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Overview

Elevators are commonly used in office and residential buildings, may be grouped in banks with multiple cars of the elevators. When requesting an elevator service, passengers typically use an interface, such as hall call panel that has several methods of providing user inputs (such as contact based inputs or contactless inputs) for operating desired direction of travel or destination floors. Embodiments of the present disclosure provide a control system and method that allows passengers of the elevators to request elevator service and indicate their desired destination floor with contactless inputs. More specifically, the control system uses a sensor to measure distance to a hand of a user, compare the measured distance against referenced distance and confirm a selection of a destination floor for service by analyzing motion of the hand, and registers the selected floor with an elevator control system.

Figure 1A:
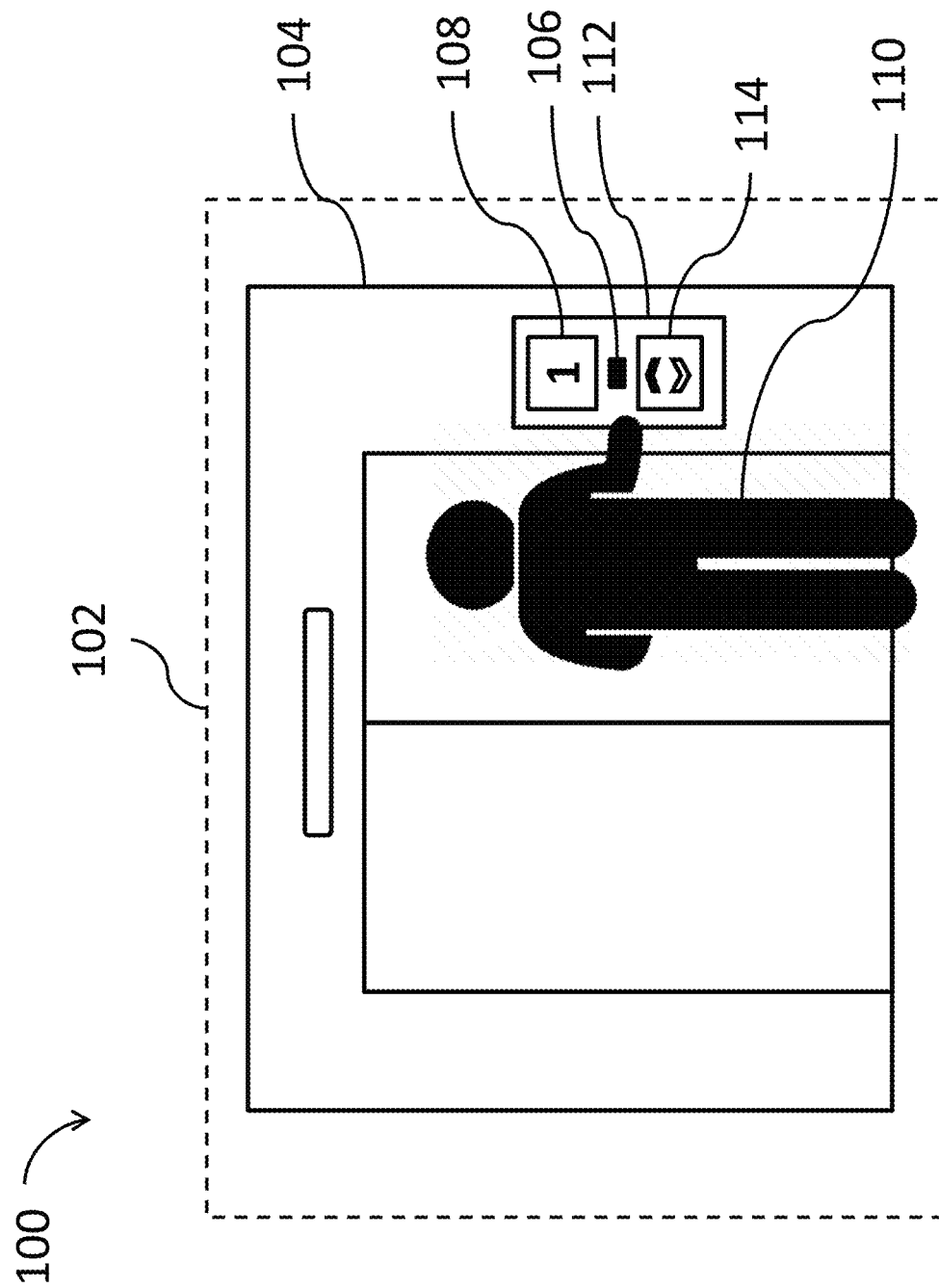
FIG. 1A shows an environment representation for controlling an operation of an elevator of a building, according to some embodiments of the present disclosure.

FIG. 1A shows an environment representation 100 for controlling movement of an elevator 104 of a building 102, according to some embodiments of the present disclosure. The elevator 104 in the building 102 moves a user 110 from one service floor to another service floor of the building 102. The environment representation includes a user 110 at a service floor to access the elevator 104 and move to the other service floor of the building 102. The elevator 104 includes an input/output (I/O) interface 112. A similar input interface 112 may be installed inside the elevator 104 for receiving inputs for operating the elevator 104. In some embodiments, the I/O 112 receives contactless inputs via a sensor 106. The sensor 106 may be may be embedded within the I/O 112. The I/O 112 may also include a display device 108 for displaying floor values of the building 102. Additionally or alternatively, the I/O 112 may include a visual guide 114 to indicate a direction of movement of the elevator 104 upon confirmation of a selected destination floor. For instance, the visual guide 114 may indicate an upward movement or a downward movement of the elevator 104. In some embodiments, the visual guide 114 may be a light indicator that blinks to indiate the direction of movement of the elevator 104.

In an example embodiment, the user 110 provides contactless inputs to the I/O interface 112 via the sensor 106 to move the elevator 104 up or down in the building 102. To that end, the user 110 places his hand in a line-of-sight of the sensor 106 and moves the hand upwards/downwards or forwards/backwards to provide the contactless inputs. The sensor 106 measures a distance to the hand of the user 110. A destination floor may be selected based on the measured distance. The selected destination floor is displayed on the display device 108. The distance measurement is provided to a control system, which is further described next with reference to FIG. 1B.

Figure 1B:
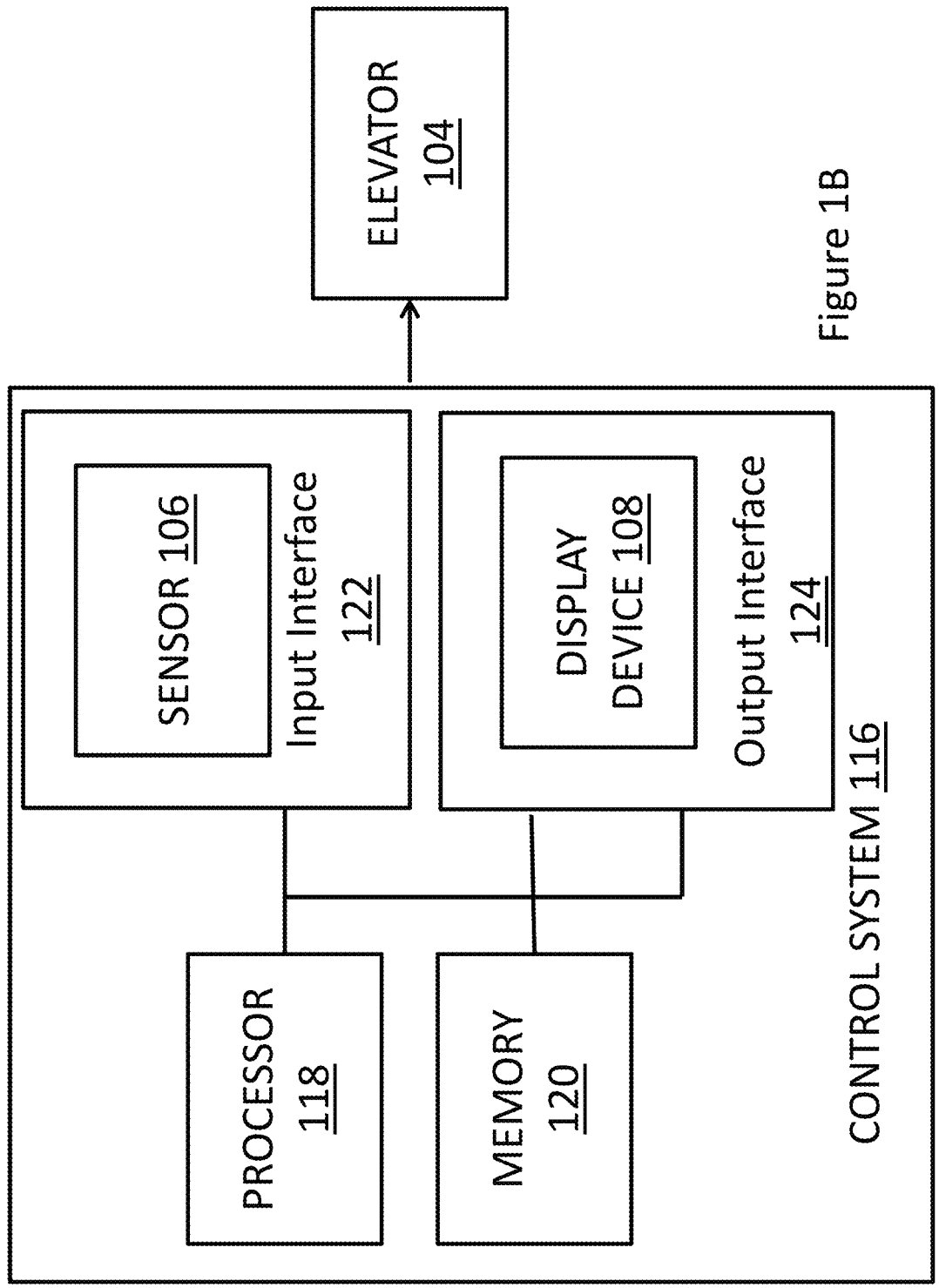
FIG. 1B shows a control system for controlling the operation of the elevator, according to one example embodiment of the present disclosure.

FIG. 1B shows a control system 116 for controlling the operation of the elevator 104, according to one example embodiment of the present disclosure. The control system 116 comprises a processor 118, a memory 120, an input interface 122 that includes the sensor 106, and an output interface 124 that includes the display device 108. The output interface 124 is configured to cause the display device 108 to display a floor value indicating a destination floor. The input interface 122 and the output interface 124, in combination, correspond to the I/O interface 112 of FIG. 1A. In some embodiments, in the control system 116, the processor 118 is connected to the sensor 106 and the display device 108, via wired connections. In some other embodiments, the processor 118 is connected to the sensor 106 and the display device 108, via wireless connections. The memory 120 is configured to store computer executable instructions that are executed by the processor 118 for controlling movement of the elevator 104. The input interface 122 is configured to receive a measurement of a distance metric to an object (e.g. the hand of the user 110) located at a service floor in a line-of-sight of the sensor 106, via the sensor 106. The sensor 106 is configured to sense presence of the object located at the line-of-sight of the sensor 106 and measure the distance to the object. The measurement of the distance to the object is further provided to the processor 118.

The processor 118 is configured to compare the received distance with a referenced distance to estimate a value of the comparison and a sign of the value of the comparison (also called as a sign of comparison). The sign of the comparison indicates direction (e.g. the upward or downward direction) of an elevator service of the elevator 104. The value of the comparison indicates a frequency of updating floor values displayed on the display device 108. A floor value indicating a floor is displayed on the display device 108. The floor value is displayed along with the direction of the elevator service. The processor 118 is also configured to repeatedly update the floor value displayed on the display device 108 until a termination condition is met. Upon meeting the termination condition, the processor 118 is further configured to cause the elevator 104 to perform the service operation from the service floor to the destination floor that is indicated by the displayed floor value.

Figure 2:
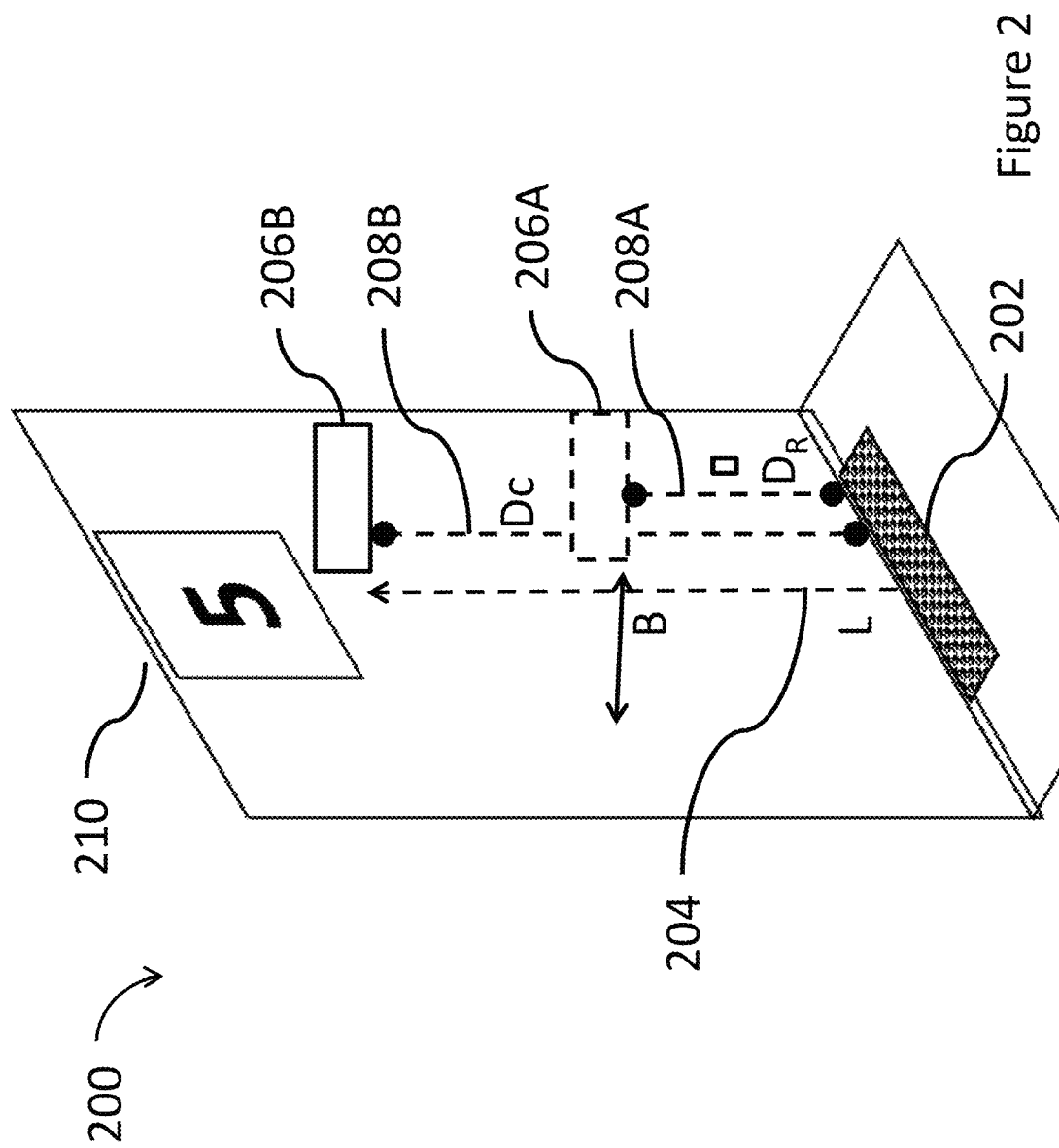
FIG. 2 shows an input/output (I/O) interface for measurement of a distance to an object located in a line-of-sight of a sensor of the control system, according to one example embodiment of the present disclosure.

FIG. 2 shows an I/O interface 200 for measurement of a distance to an object located in a line-of-sight 204 of a sensor 202, according to one example embodiment of the present disclosure. The I/O interface 200 includes the sensor 202 (as an input interface) and a display device 210 (as the output interface). The I/O interface 200 corresponds to the I/O interface 112 of FIG. 1A. The sensor 202 corresponds to the sensor 106. The display device 210 corresponds to the display device 108. In one example embodiment, the sensor 202 may be installed at a pedestal area of the elevator 104. The sensor 202 projects light having a line-of-sight 204 (i.e. "L" as shown in FIG. 2).

Further, it is shown in the FIG. 2 that the sensor 202 is in such a manner that the light is projected in a vertical direction and the line-of-sight 204 of the sensor 202 is in the vertical direction. When the object falls in the line-of-sight 204, the sensor 202 measures distance to the object. For instance, the object is at a position 206B and the sensor 202 measures a distance ($D_C$) 208B. The distance ($D_C$) 208B is compared against a referenced distance ($D_R$) 208A. The referenced distance ($D_R$) 208A corresponds to a baseline (B) position 206A, which is a prefixed position for referencing distances of the object at the line-of-sight 204. In some cases, the baseline (B) position 206A may be marked on a wall of the elevator 104 to provide a visual guide to users (such as the user 110) for positioning their hands. In some other cases, the baseline (B) position 206A may be invisible to the user 110.

The comparison of the measured distance ($D_C$) 208B and the referenced distance ($D_R$) 208A provide a sign indicating direction of elevator service, which is explained next with reference to FIG. 3A.

Figure 3A:
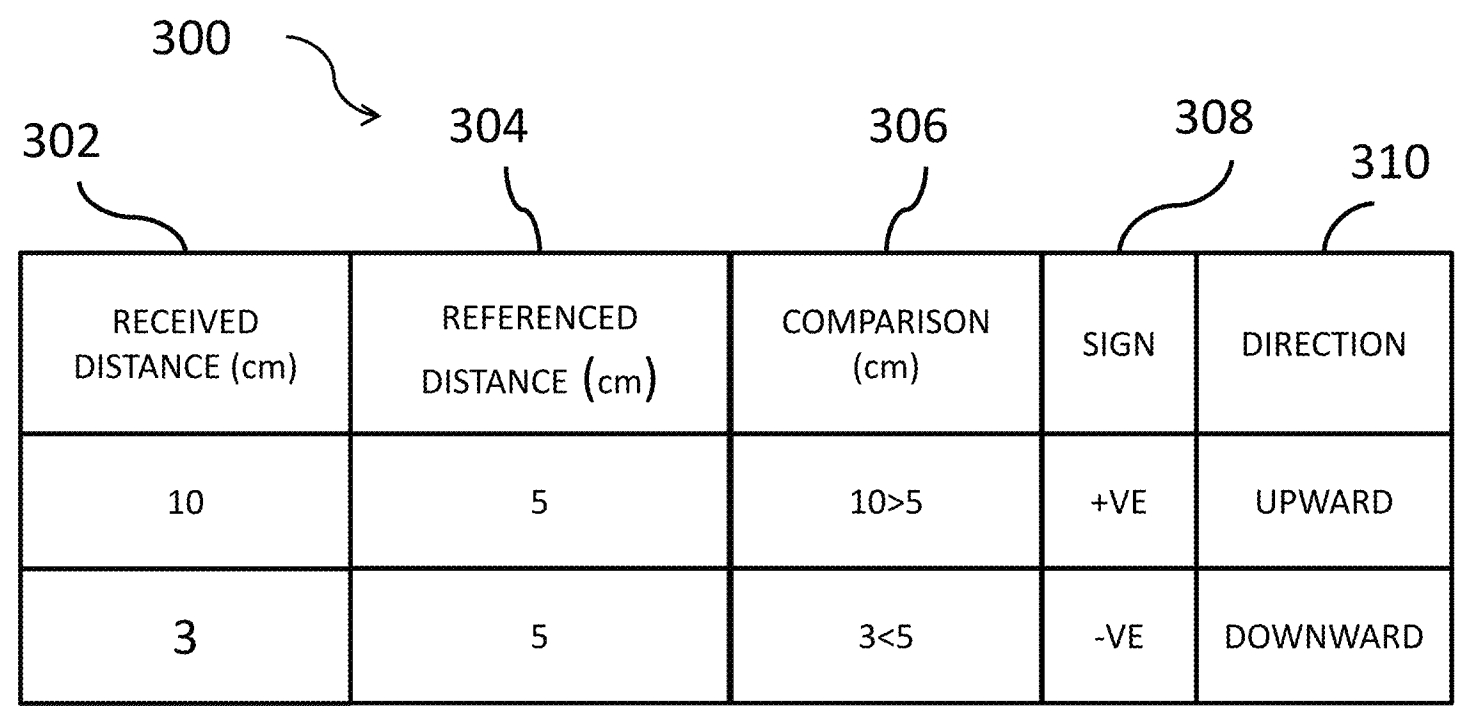

FIG. 3A shows a tabular representation 300 depicting direction of elevator service of the elevator 104, according to one example embodiment of the present disclosure. The tabular representation 300 includes columns, such as received distance 302, referenced distance 304, comparison 306, sign 308 and direction 310. The received distance 302 and referenced distance 304 may be measured in centimeters (cm). The received distance 302 corresponds to the measured distance ($D_C$) 208B. The referenced distance 304 corresponds to the referenced distance ($D_R$) 208A.

For instance, the received distance 302 is 10 cm and the referenced distance 304 is 5 cm. The control system 116 determines the comparison 306 between the received distance 302 (i.e. 10 cm) and the referenced distance 304 (i.e. 5 cm). Based on the comparison 306, the control system 116 estimates the sign 308 corresponding to the comparison 306, where the sign 308 is estimated as a positive (+ve) sign as the received distance 302 is greater than the referenced distance 304. Further, the processor 118 of the control system 116 is configured to cause the display device 210 to indicate the direction 310 as an upward direction of the elevator service, when the sign 308 of the comparison 306 is positive. In some cases, the received distance 302 may be smaller than the referenced distance 304. For instance, the received distance 302 (e.g. 3 cm) is smaller than the referenced distance 304 (e.g. 5 cm). In such cases, the sign 308 is negative and the direction 310 indicated is in downward direction.

The processor 118 estimates a value on the basis of which a floor value is repeatedly updated, based on the comparison 306 of the received distance 302 and the referenced distance 304, which is described next with reference to FIG. 3B.

FIG. 3B shows a tabular representation 312 depicting update changes regarding floor value displayed on the display device 210 in the direction of the elevator service, according to one example embodiment of the present disclosure. The tabular representation 312 includes columns, such as the received distance 302, the referenced distance 304, the comparison 306, value 314 of the comparison 306, and frequency of update 316.

In some embodiments, the frequency of update 316 is proportional to the value 314 of the comparison 306 such that a greater value of the comparison 306 increases the frequency of the update with respect to a lower value of the comparison 306. The frequency of update 316 stores information to increment or decrement rate of change of a displayed floor value based on the value 314 of the comparison 306 between the received distance 302 and the referenced distance 304. More specifically, the floor value is updated (incremented or decremented) based on the value 314 of the comparison 306 per time unit (e.g. per second).

For instance, the received distance 302 is "10 cm" and the referenced distance 304 is "5 cm". The value 314 of the comparison 306 in such a case is "5". Accordingly, the frequency of update 316 is 5 times per second based on the value of the comparison (i.e. 5). The processor 118 further estimates the sign 308 based on the value 314 of the comparison 306, where the sign 308 is a positive sign indicating an upward direction as the received distance 302 (i.e. $10 cm$) is greater than the referenced distance 304 (i.e. 5 cm). Accordingly, for the value 314 of the comparison 306 of "5" with a positive sign and upward direction, a displayed floor value (such as $15^{th}$ floor) is incremented by 5 (such as to $20^{th}$ floor) in one second. Further, the displayed value of $15^{th}$ floor changes to $25^{th}$ floor in two seconds based on the frequency of update 316 that is "5".

Further, in case the received distance 302 (i.e. 3 cm) is smaller than the referenced distance 304 (i.e. 5 cm), the comparison 308 corresponds to a negative sign indicating a downward direction. The frequency of update is 2 times per time unit based on the value 314 of the comparison 306, and the display floor value is decremented by 2 floors in each second. Accordingly, the displayed floor value (such as $15^{th}$ floor) is decremented to a floor (such as $10^{th}$ floor) in 2.5 seconds.

The repeated update of the floor value in the direction of the elevator service based on the sign 308 and the value 314 of the comparison 306 is terminated based on a termination condition, which is explained next in FIG. 3C.

Figure 3C:
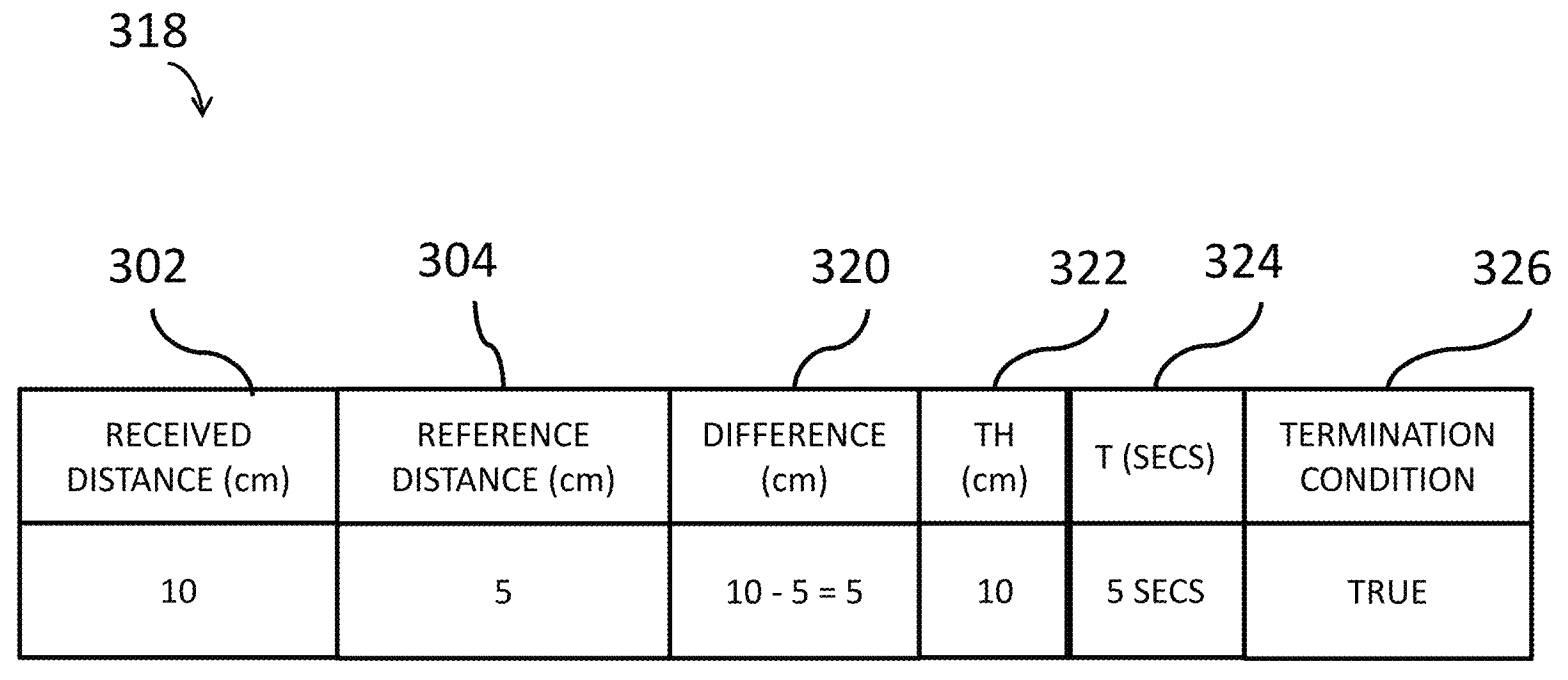

FIG. 3C shows a tabular representation 318 depicting termination condition for the elevator service, according to one example embodiment of the present disclosure. The tabular representation 318 includes columns, such as the received distance 302, the referenced distance 304, difference 320 (between the received distance 302 and the referenced distance 304), distance threshold (TH) 322, time (T) 324, and termination condition 326.

The repeated update of the displayed floor value stops when a termination condition is met. In such a case, the frequency of update corresponds to zero.

In some embodiments, the termination condition 326 is based on the frequency of update and a threshold time period (i.e. the time (T) 324). For example, the received distance 302 is "10 cm" and the referenced distance 304 is "5 cm". In such a case, the difference 320 is "5 cm" and accordingly, a value of the comparison between the received distance 302 and the referenced distance 304 is "5". Based on the value of the comparison and a sign of the value, the frequency of update is determined as "5" such that the floor value is incremented 5 times per second for the threshold time (e.g. 2 seconds). Accordingly, after elapse of the 2 seconds, the termination condition 326 is met and the update of the floor value is stopped. Alternatively, in some embodiments, the termination condition 326 is based on the frequency of update (such as 5 times per second) and a floor value of a top floor of the building 102. In such cases, the floor value is incremented 5 times per second till the floor value is updated to the floor value of the top floor. Accordingly, after floor value of the top floor is updated, the termination condition 326 is met and the update of the floor value is stopped.

In some embodiments, the termination condition 326 is met when the value 314 of the comparison 306 (indicated by the difference 320 between the received distance 302 and the referenced distance 304) is below the distance threshold (TH) 322 for a period of time greater than a threshold time (i.e. the time (T) 324). For instance, the difference 320 (5 cm) is less than the distance threshold (TH) 320 (10 cm) for the period of time (such as 6 seconds) and the period of time is greater than the threshold time (such as 5 seconds), the termination condition 326 is "true".

In a case where the user 110 places his hand at the referenced distance 304 (i.e. at the baseline (B)) and wait for a period of time (such as 7 seconds), the received distance 302 is equal to the referenced distance 304 such that the difference 320 is "zero" which is less than the distance threshold (TH) 322 (such as 10 cm) for the period of time (7 seconds) greater than the threshold time (such as 5 second). In such a case, the termination condition 326 is met and the update of the displayed floor value is stopped.

In some embodiments, the distance threshold (TH) 320 may be a value of a distance, from the baseline (B), associated with the top floor of the building 102. In some cases, difference 320 is more than the distance threshold (TH) 322, where the difference 320 corresponds to a frequency of update such that a floor value is updated. The updated floor value exceeds the floor value of the top floor as the difference 320 is more than the distance threshold (TH) 322. In such cases, the processor 118 is configured to update the floor value to the floor value of the top floor and terminate the repeated update of the floor value. Accordingly, the floor value is updated as the floor value of the top floor and the termination condition 326 is considered to be met.

After the termination condition 326 is met, the user 110 may again provide an input to select a destination floor by moving his hand in the line-of-sight 204 of the sensor 202.

In some embodiments, the floor values are associated with floors of the building 102, which is described next in FIG. 4.

Figure 4:
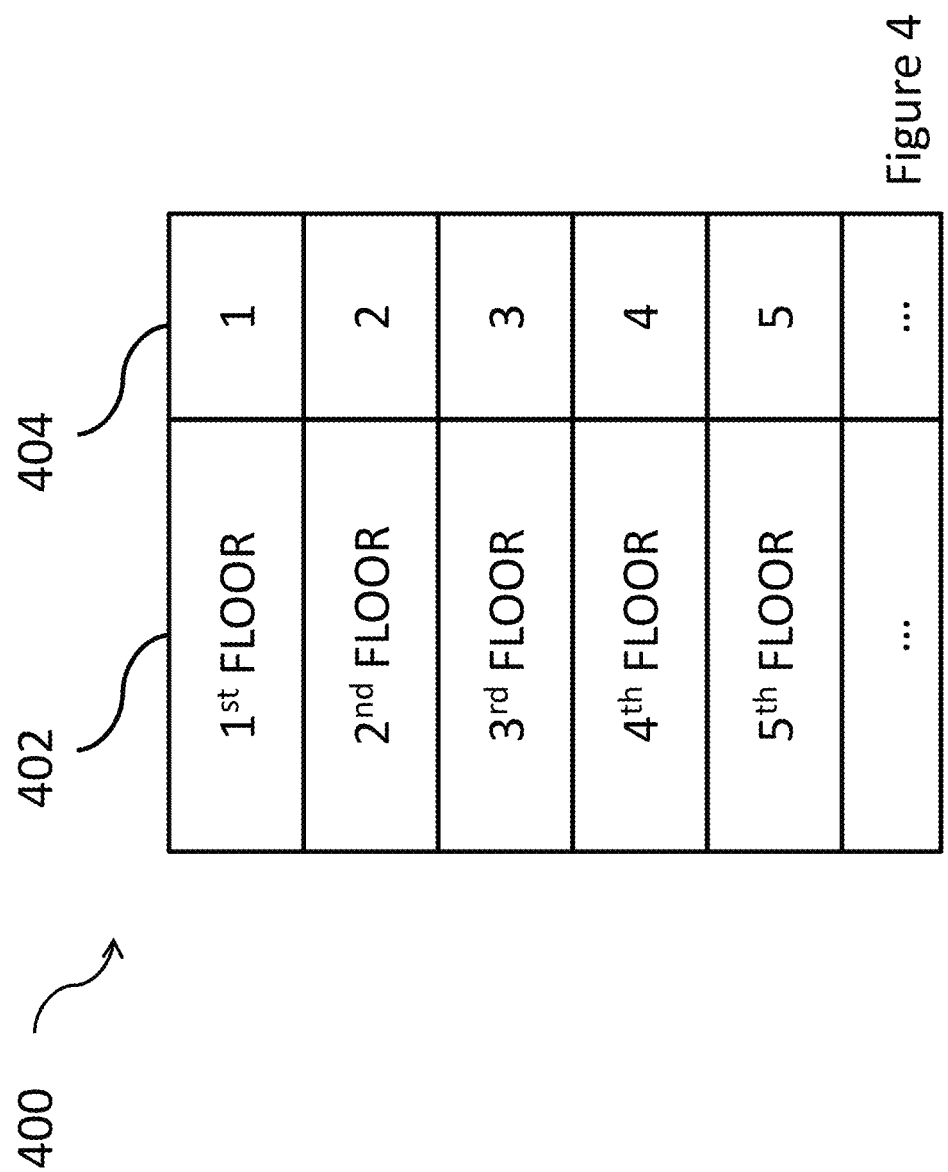
FIG. 4 shows a tabular representation depicting floor values associated with floors of the building, according to one example embodiment of the present disclosure.

FIG. 4 shows a tabular representation 400 depicting floor values associated with floors of the building 102, according to one example embodiment of the present disclosure. The tabular representation 400 includes a column of floors 402 and a column of floor values 404. Each floor of the building 102 represented in the column of floors 402 is associated with a floor value in the column of the floor values 404.

The floor values in the column of the floor values 404 are a sequence of whole numbers, as shown in the tabular representation 400. In the column of floor values 404, smaller values are based on distance values that correspond to lower floor values. Each of the distance values corresponds to a relationship between each value of a distance from the sensor 202 to the object and the referenced distance. Further, each of the floor values displayed on the display device 210 is increased or decreased sequentially upon the update of the floor value.

Figure 5:
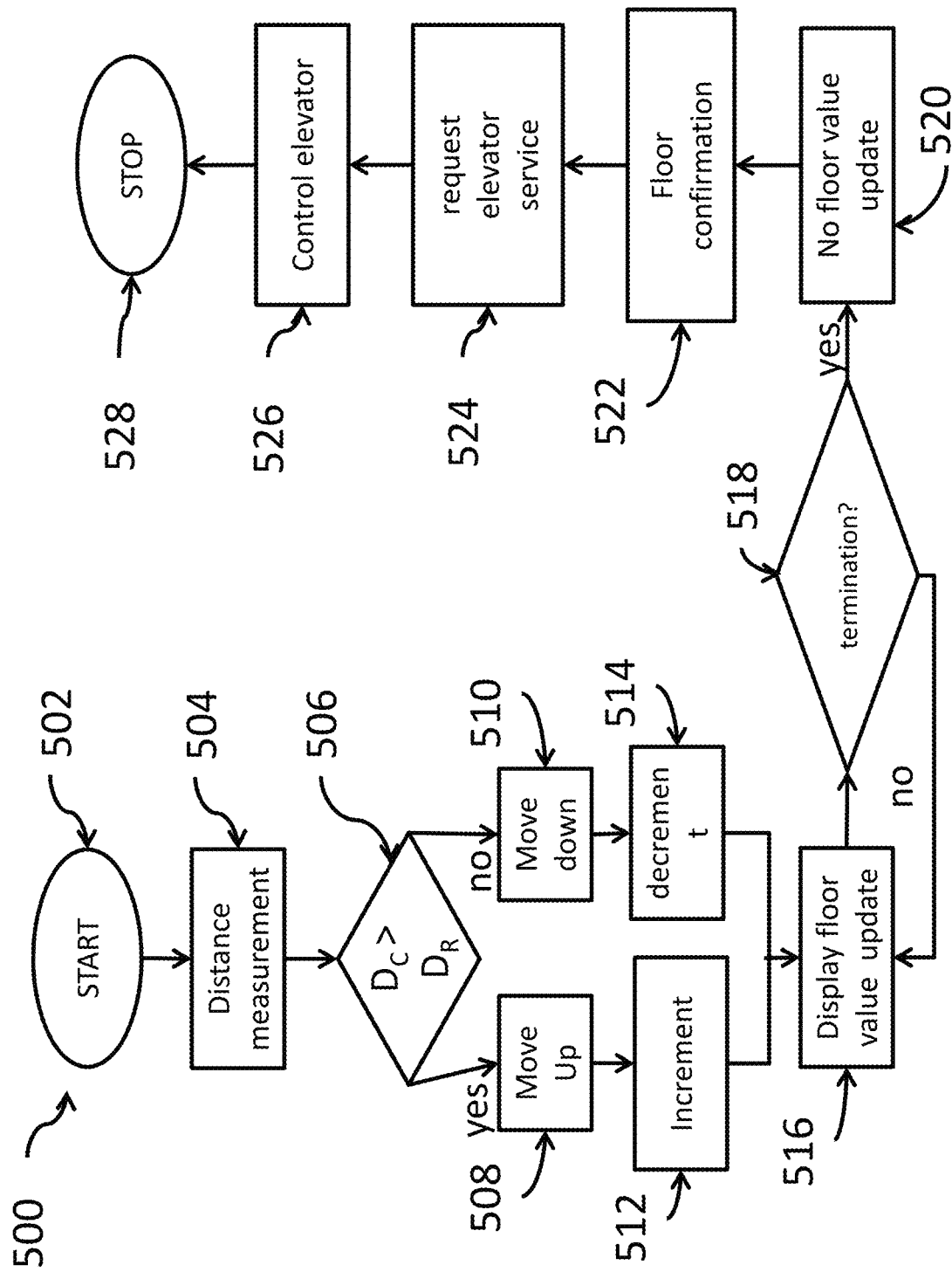
FIG. 5 shows a flow chart for controlling the operation of the elevator, according to one example embodiment of the present disclosure.

FIG. 5 shows a flow chart 500 for controlling the operation of the elevator 104, according to one example embodiment of the present disclosure. In some embodiments, the processor 118 of the control system 116 may be configured to execute steps of the operation. The flow chart 500 starts at step 502.

At step 504, a measured distance ($D_C$) of the object is received from the sensor 202. The sensor 202 measures the distance when the object (such as a hand of a user) is located in the line-of-sight 204 of the sensor 202. For example, the user moves his hand in the line-of-sight 204 of the sensor 202. Based on a current position of the hand of the user, the sensor 202 measures the distance.

At step 506, the measured distance (DC) is compared against a referenced distance (DR). To that end, the processor 118 acquires the measured distance (DC) from the sensor 202 and extracts the referenced distance (DR) from the memory 120.

At step 508, a direction of the elevator movement is indicated in an upward direction in case the measured distance (DC) is greater than the referenced distance (DR). Further, the control passes to step 512.

At step 510, the direction of the elevator movement is indicated in a downward direction in case the measured distance (DC) is less than the referenced distance (DR). Further, the control passes to step 514.

At step 512, a displayed floor value is incremented based on the frequency of update estimated based on the value of the measured distance (DC) being greater than the referenced distance (DR). To that end, the processor 118 calculates the frequency of update based on a value of the difference between the measured distance (DC) and the referenced distance (DR). The value of the difference corresponds to a number of floors to be incremented. Further, the control passes to step 516.

At step 514, the displayed floor value is decremented based on the frequency of update estimated based on the value of the measured distance (DC) being lesser than the referenced distance (DR). To that end, the processor 118 calculates the frequency of update based on a value of the difference between the measured distance (DC) and the referenced distance (DR). The value of the difference corresponds to a number of floors to be decremented. Further, the control passes to step 516.

At step 516, the updated floor value is displayed based on one of the increment of the number of the floors or the decrement of the number of floors. The processor 118 causes the display device 210 to display the updated floor value.

At step 518, the termination condition is checked. If the termination condition is not met, go to step 516. Otherwise the control passed to step 520. At step 520, the repeated update of the displayed floor value is terminated, when the termination condition is satisfied. In some embodiments, the termination condition is met when the value of the comparison indicated by the difference between the received distance (DR) and the referenced distance (DC) is below a distance threshold for a period of time greater than a threshold time. In such cases, no floor value is updated.

At step 522, destination floor is confirmed when the termination condition is met. To that end, the processor 118 considers the value being displayed on the display device as the confirmed floor (i.e. a destination floor).

At step 524, an elevator service of the elevator 104 is requested based on the confirmation of the destination floor.

At 526, the elevator 104 is controlled to move the elevator 104 to the destination floor by the floor value displayed on the display device upon meeting the termination condition, and the operation ends at step 528.

Figure 6A:
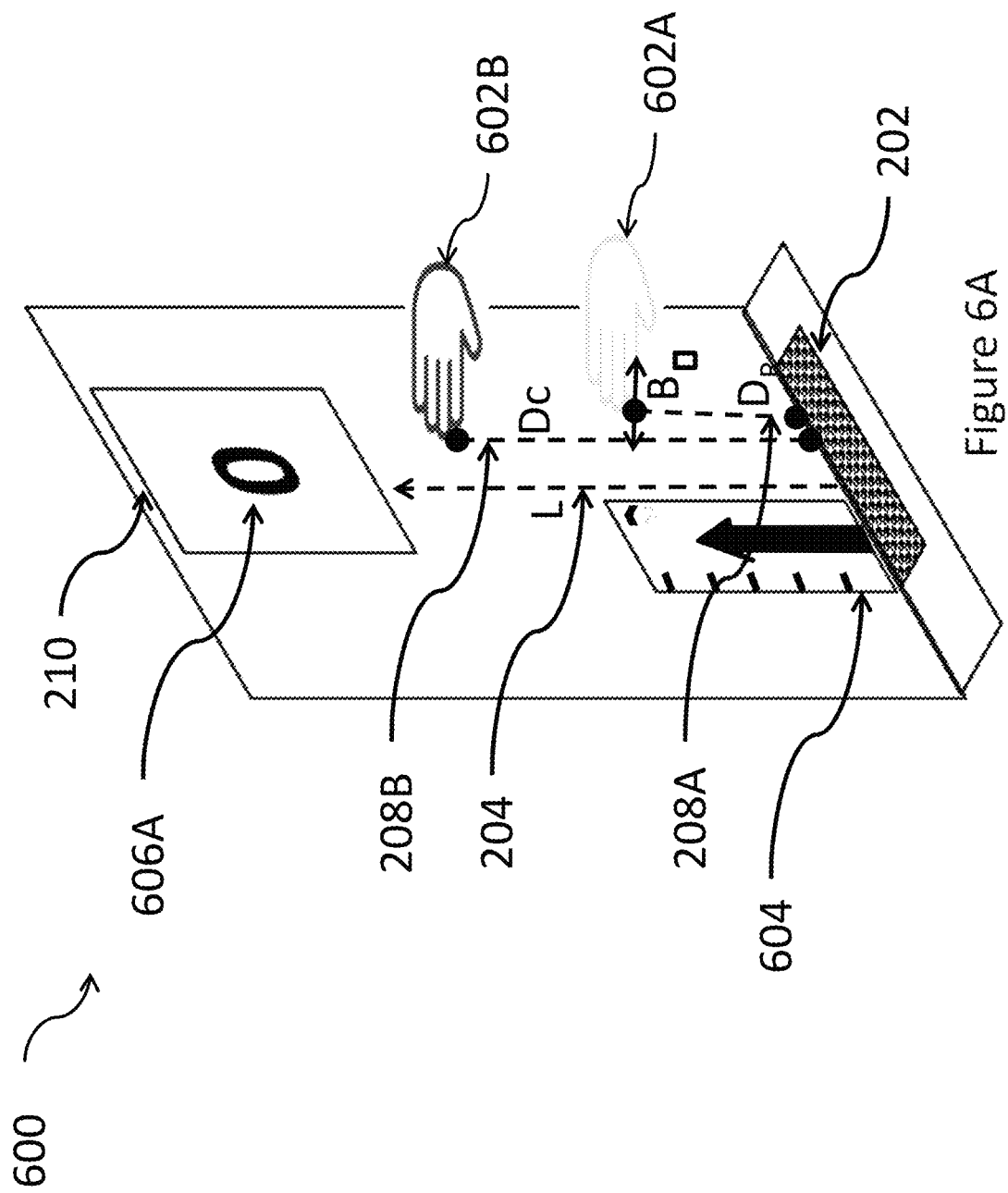
FIG. 6A shows an I/O interface for measurement of a distance to a hand of a user located in a line-of-sight of a sensor of the control system, according to one example embodiment of the present disclosure.

FIG. 6A shows an I/O interface 600 for measurement of a distance to a hand of the user 110 located in the line-of-sight (L) 204 of the sensor 202 of the control system 116, according to one example embodiment of the present disclosure. The I/O interface 600 corresponds to the input interface 200.

The hand of the user 110 provides contactless inputs via the sensor 202. The user 110 moves up the hand at the line-of-sight (L) 204. When the hand is moved upwards, the hand moves away from a baseline B. For instance, the hand of the user 110 moves upwards from an initial position 602A to a position at 602B. The distance of the baseline B corresponds to the referenced distance (DR) 208A and distance to the position 602B corresponds to the measured distance (DC) 208B. In one example embodiment, the referenced distance (DR) 208A may be an initial distance to the hand. This may allow different users with different heights to change the destination floor by moving the hand within the line-of-sight 204 with respect to the initial position of the hand. For instance, users that are below 10 years of age may have shorter height than adult users. A user of shorter height may move the hand with respect to the initial position to change the destination floor, in a convenient manner. Further, the referenced distance (DR) 208A is compared with the measured distance (DC) 208B and a sign and a value of the comparison are determined based on the comparison.

Figure 6B:
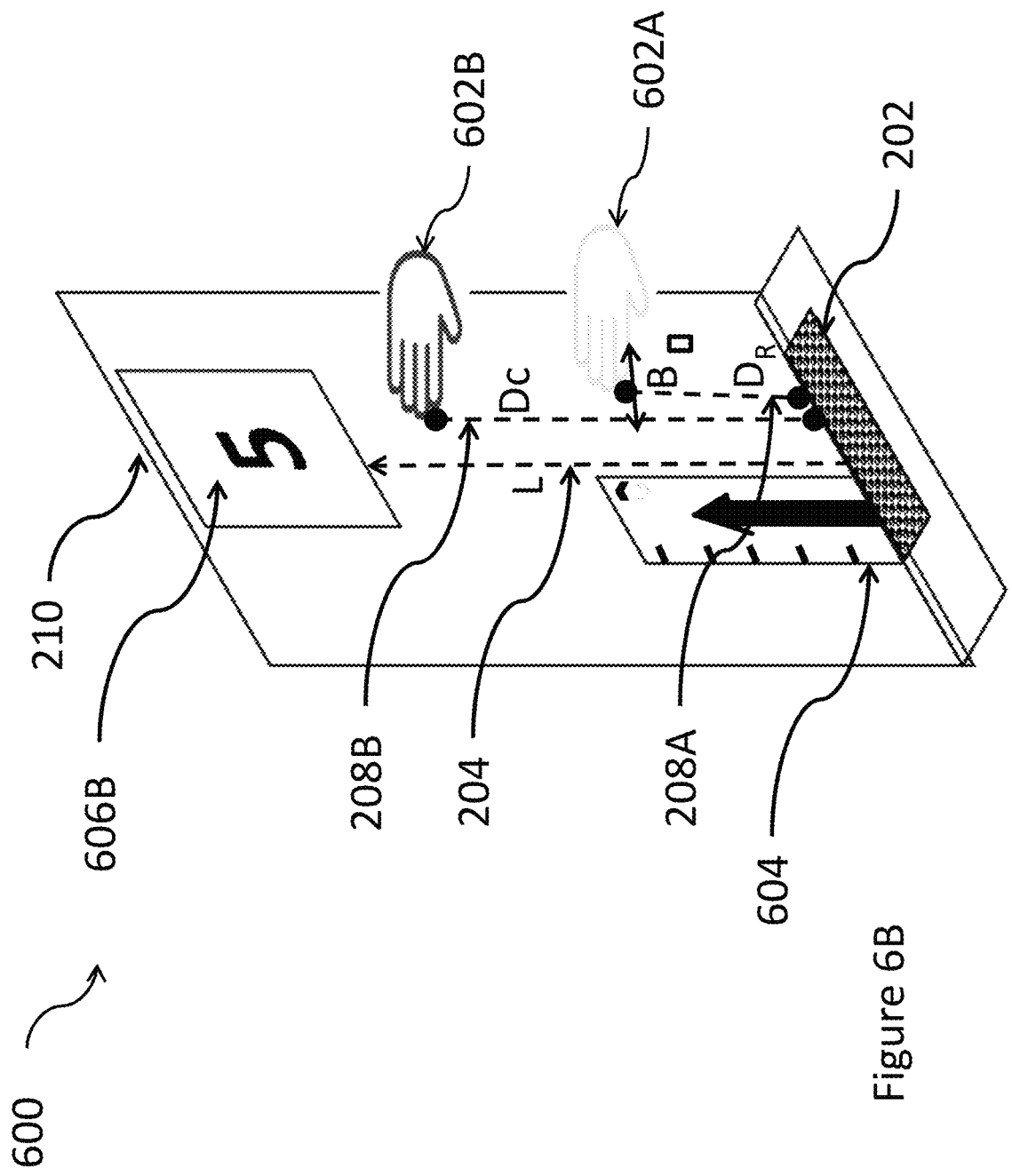
FIG. 6B shows an I/O interface for measurement of a distance to a hand of a user located in a line-of-sight of a sensor of the control system, according to one example embodiment of the present disclosure.

In case the referenced distance (DC) 208B is greater than the measured distanced (DR) 208A, the sign of the comparison is positive and the value of the comparison indicates an upward direction. The upward direction may be indicated to the user 110 via a visual indicator 604. The visual indicator 604 may also display increment of a displayed floor value (e.g. floor value 0) based on a frequency of update provided by the value of the comparison. In an illustrative example scenario, a floor value 606A (such as floor value 0) is displayed on the display device 210. The displayed floor value 606A is incremented to a floor value 606B (e.g. floor value 5) in one second, as shown in FIG. 6B. The floor value 606A is incremented based on the frequency of update, such as 5 times per second.

Figure 6C:
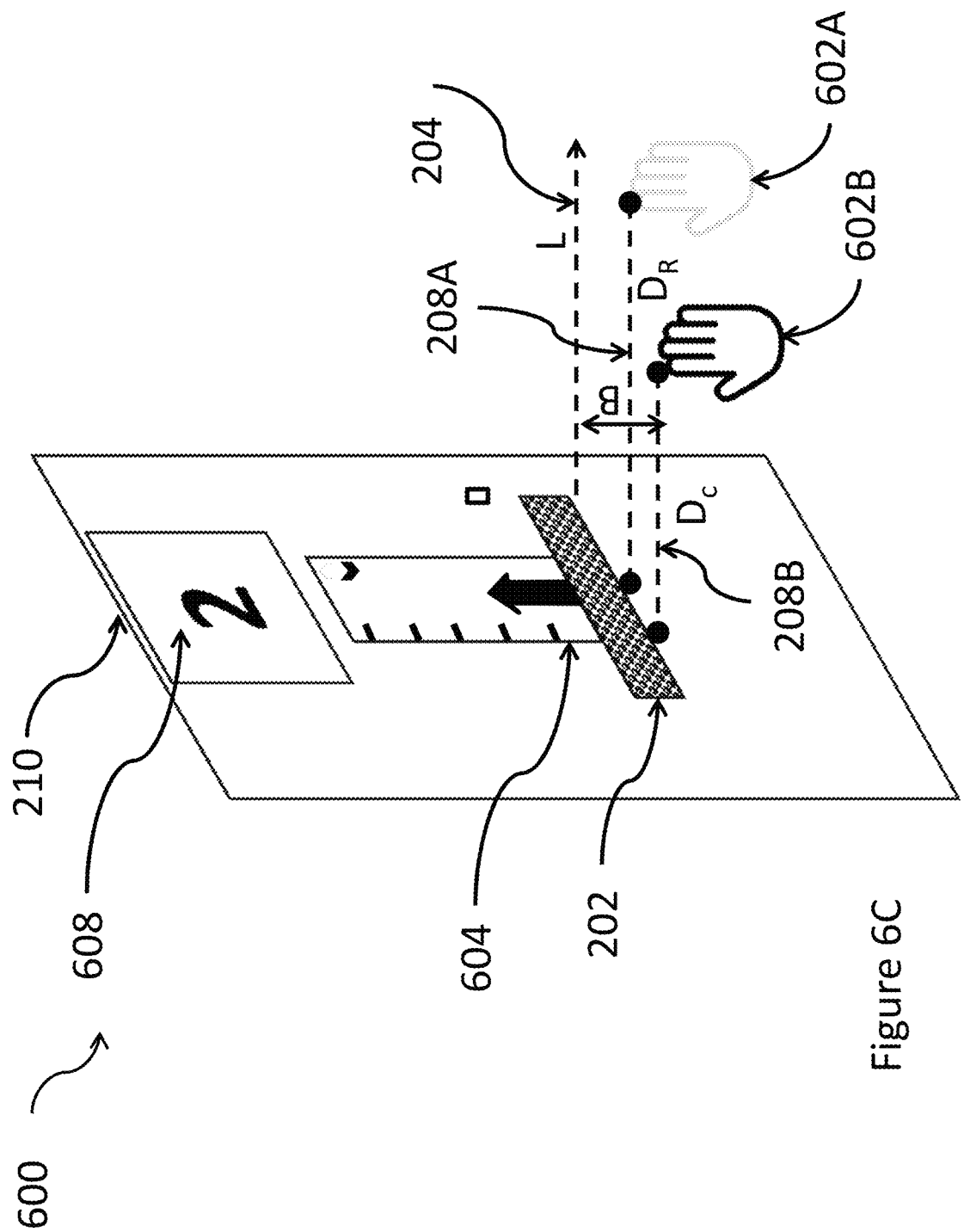
FIG. 6C shows an I/O interface for measurement of a distance to a hand of a user located in a line-of-sight of a sensor of the control system, according to another example embodiment of the present disclosure.

In some embodiments, the sensor 202 may be implemented horizontally and the line-of-sight (L) 204 is projected in horizontal direction, which is shown in FIG. 6C.

FIG. 6C shows the I/O interface 600 for measurement of the distance to the hand of the user 110 located in the line-of-sight (L) 204 of the sensor 202 of the control system 116, according to another example embodiment of the present disclosure.

The user 110 places the hand in front of the sensor 202 in the line-of-sight (L) 204 and moves forward or backward from the baseline B. The hand of the user 110 moves forward towards the baseline B, as shown in FIG. 6C. The hand moved from a position 602A to a position 602B. The sensor 202 measures a distance (DC) 208B to the hand position 602B. The measured distance (DC) 208B is compared against a referenced distance (DR) 208A. A displayed floor value 608 on the display device 210 is decremented, as the hand moves towards the baseline B.

For instance, the user 110 wants to go to 2nd floor (floor value 2) from 5th floor (the floor value 5). In such a case, the user 110 may provide input to decrease the floor value 5. To that end, the user 110 moves the hand such that the measured distance (DC) 208B is less than the referenced distance (DR) 208A. The comparison between the referenced distance (DR) 208A and the measured distance (DC) 208B is utilized to estimate a sign (i.e. a negative sign or a positive sign) indicating a direction (i.e. an upward direction or a downward direction) as indicated in the visual guide 604. If the sign of the value of the comparison (such as "3") is negative, the direction associated with floor is estimated as the downward direction and the displayed floor value 608 is decremented based on a frequency of update (such as 3 times per time unit) provided by the value of the comparison. Accordingly, the elevator 104 is controlled to move downwards from the 5th floor to the 2nd floor in one second.

Figure 6D:
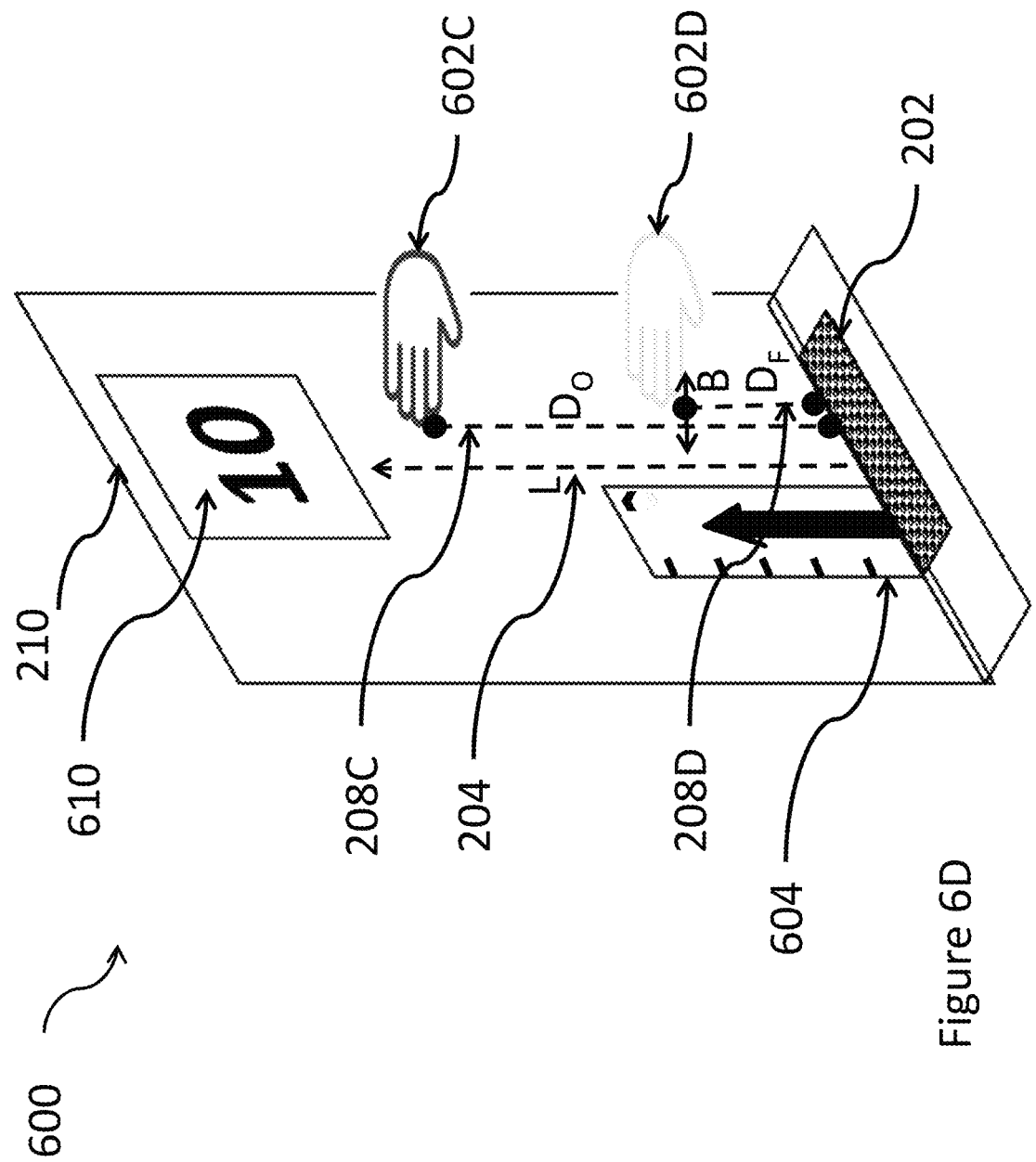
FIG. 6D shows an I/O interface for measurement of a distance to a hand of a user located at a maximum position in a line-of-sight of a sensor of the control system, according to one example embodiment of the present disclosure.

FIG. 6D shows the I/O interface 600 for measurement of a distance to the hand of the user 110 located at a maximum position in a line-of-sight of a sensor of the control system 116, according to another example embodiment of the present disclosure.

Figure 6E:
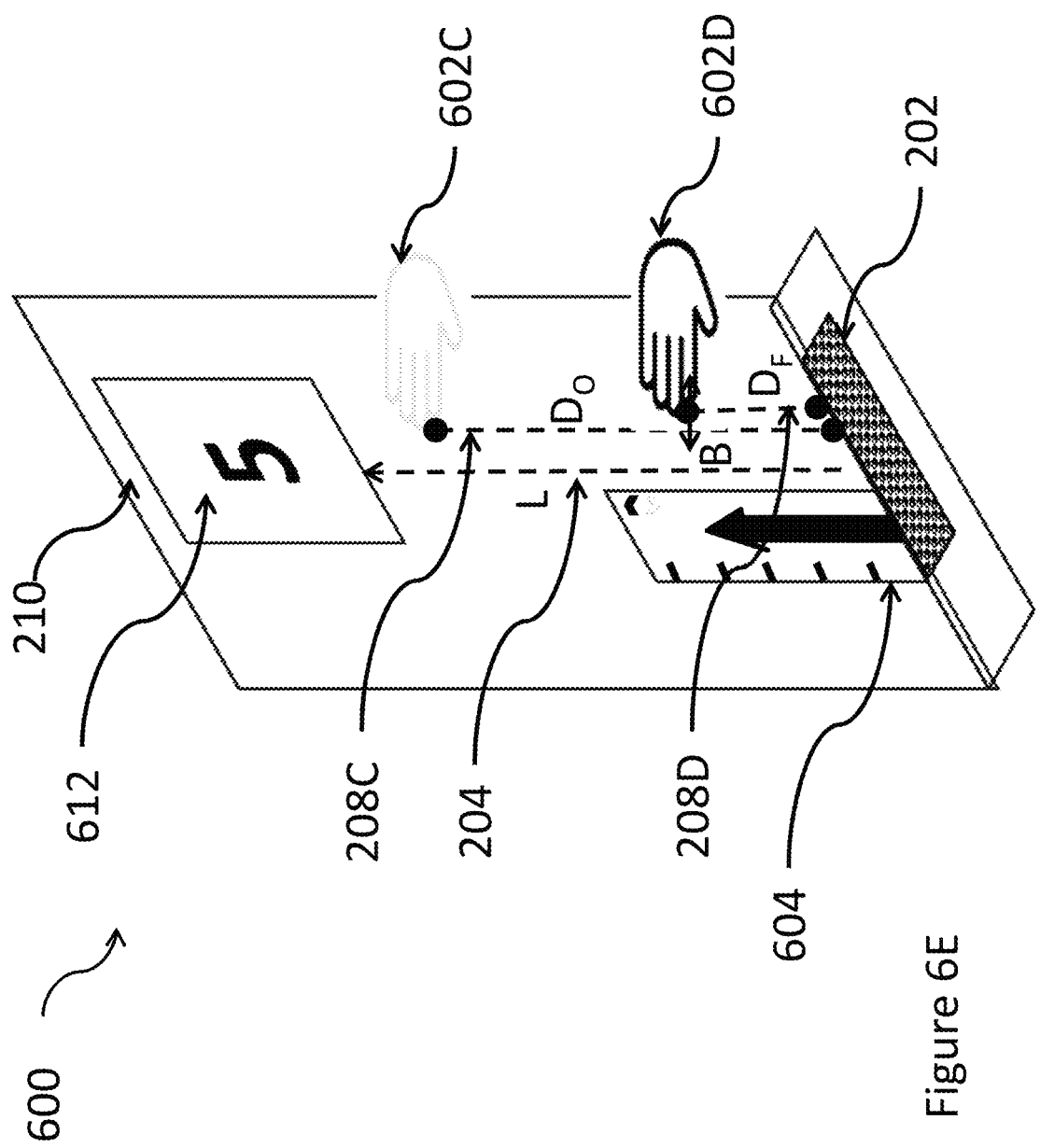
FIG. 6E shows an I/O interface for measurement of a distance to a hand of a user located in a line-of-sight of a sensor of the control system, according to one example embodiment of the present disclosure.

For instance, the user wants to go to a specific floor such as "5th floor". However, the user 110 mistakenly moves the hand at a maximum position with a distance (DO) 208C and corresponding floor value 610 (e.g. 10th floor) is displayed on the display device 210. The hand of the user 110 may be at a position 602C overshooting the floor value 610. In such cases, the user 110 may rectify the overshoot destination floor by moving the hand of the user 110 in opposite direction from the overshoot distance (DO) 602C. As shown in FIG. 6E, the hand of the user 110 is moved from the position 602C to a position 602D. Accordingly, the sensor 202 measures a distance (DF) 208D to the position 602D. Further, the processor 118 estimates the frequency of update based on a comparison of the measured distance (DF) 208D with a referenced distance. In accordance with the frequency of update, the floor value is updated (e.g. from 10th floor to 5th floor). Further, the processor 118 causes the display device 210 to display the updated floor value 612 (e.g. 5th floor).

Figure 7A:
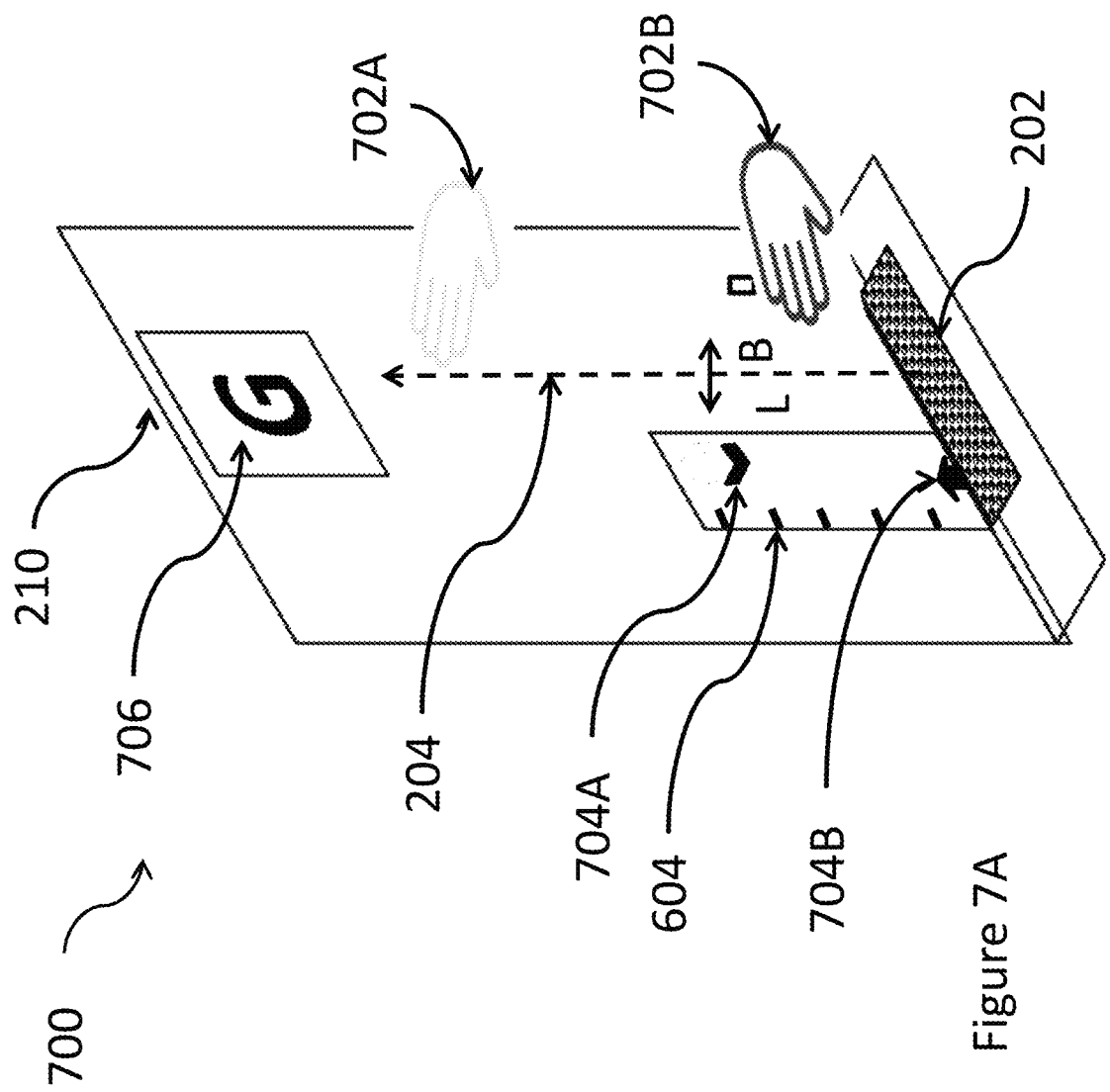
FIG. 7A shows an I/O interface for measurement of a distance to a hand of a user located in a line-of-sight of a sensor of the control system, according to another example embodiment of the present disclosure.
Figure 7B:
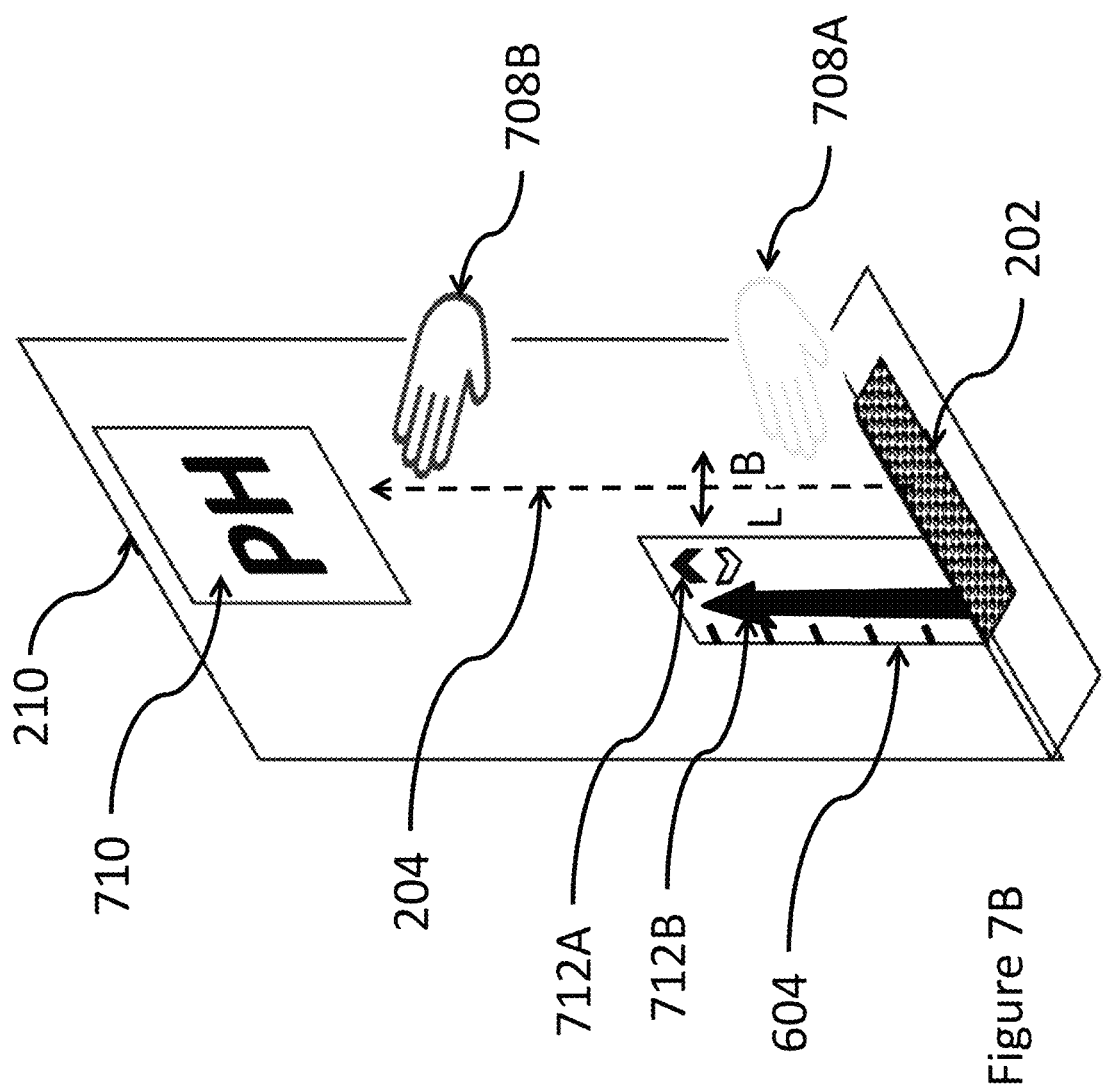
FIG. 7B shows an I/O interface for measurement of a distance to a hand of a user located in a line-of-sight of a sensor of the control system, according to another example embodiment of the present disclosure.

In some example embodiments, commonly used floors may be selected through contactless inputs, which are described in FIGS. 7A and 7B.

FIG. 7A shows an I/O interface 700 for measurement of a distance to a hand of the user 110 located in the line-of-sight (L) 204 of the sensor 202, according to another example embodiment of the present disclosure.

The I/O interface 700 corresponds to the I/O interface 600. The user 110 places his hand in the line-of-sight 204 of the sensor 202. The user 110 moves the hand from a position 702A to a position 702B. The position 702B is before the baseline B and is near to the sensor 202. Further, the sensor 202 measures a distance to the hand at the position 702B from the sensor 202. The measured distance (e.g. 5 cm) is compared against a distance between the sensor 202 and the baseline B (e.g. 10 cm). Based on a value (e.g. 5) of the comparison of the distances a sign associated with the value is determined (e.g. a negative sign (as 5 cm<10 cm)).

In some embodiments, the value of the comparison (i.e. 5 cm) is compared with a predetermined threshold, such as 3. When the sign of comparison is negative and the value of comparison is above the predetermined threshold, the lowest floor of the building 102 is indicated. In one example embodiment, the display device 210 displays a street floor (G) 706 based on the negative sign and the value of the comparison that is above the predetermined threshold. As shown in FIG. 7A, the floor 706 is indicated by 'G' that is displayed in the display device 210. Additionally, or alternatively, the visual guide 604 indicates downward direction 704A and movement level 704B of the elevator service.

In a similar manner, the highest floor of the building 102 may be indicated on the display device 210, which is explained next in FIG. 7B.

FIG. 7B shows an I/O interface 700 for measurement of a distance to a hand of the user 110 located in the line-of-sight (L) 204 of the sensor 202, according to another example embodiment of the present disclosure.

The user 110 moves the hand from a position 708A close to the sensor 202 to a position 708B. The position 708B may be farthest from the baseline B. The sensor 202 measures a distance to the hand at the position 708B and compares with a distance to the baseline B. For example, the measured distance to the position 708A (such as 20 cm) is compared with the distance to the baseline B (such as 10 cm). The comparison between the distances at the position 708A and the position 708B provides a positive sign as the distance to the position 708B is greater than the distance to the baseline B. A value of the comparison (such as 10 cm) is further compared with a predetermined threshold (such as 3). When the value of the comparison is above the predetermined threshold, the display device 210 displays a floor value with a highest floor value of the building.

In one example embodiment, the display device 210 displays the top floor of the building 102, such as a penthouse floor 710 ('PH'), when a sign of the value of the comparison is positive and the value of comparison is above the predetermined threshold. Additionally, or alternatively, a direction of the elevator service may be indicated in the visual guide 604. The visual guide 604 indicates an upward direction 712A of the elevator service as well as a movement level 712B of the elevator service.

Figure 8A:
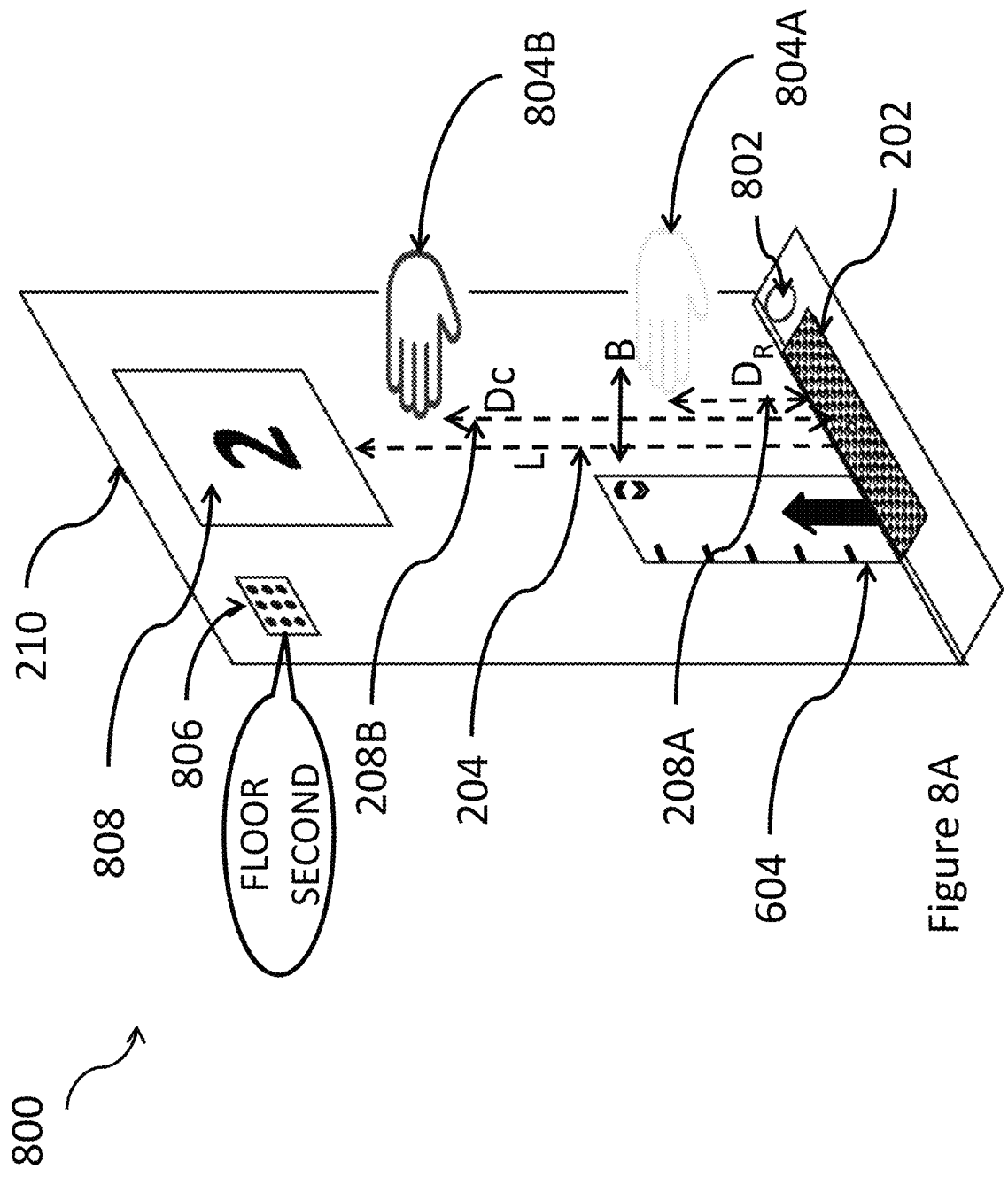
FIG. 8A shows an I/O interface for a distance measurement of hand of the user located in the line-of-sight of a sensor of control system, according to one example embodiment of the present disclosure.

FIG. 8A shows an I/O interface 800 for a distance measurement of hand of the user 110 located in the line-of-sight 204 of the sensor 202, according to one example embodiment of the present disclosure. The sensor 202 may be an IR sensor (hereinafter "IR sensor 202"). The IR sensor 202 radiates infrared light that falls on an object, such as the hand of the user 110 located in the line-of-sight 204 of the IR sensor 202. The infrared light is reflected from the hand of the user 110 back to the IR sensor 202. The IR sensor 202 captures the reflected light and measures distance to the hand of the user 110.

Some embodiments are based on the realization that a Passive IR sensor (PIR sensor) provides an efficient and feasible distance measurement with minimum resource consumption. Accordingly, in some embodiments, the IR sensor 202 may be a passive IR (PIR) sensor 202. The PIR sensor 202 may be configured to measure a radiant heat emitted from the hand of the user 110 at position 804B and determine a distance (DC) 208B to the hand based on the measured radiant heat. The determined distance may be compared against a referenced distance (DR) 208A. In one example embodiment, the referenced distance referenced distance (DR) 208A may correspond to a distance at the baseline B. In some other example embodiment, the referenced distance (DR) 208A may correspond to a distance to the hand at an initial position of 804A. A destination floor, such as floor value 808 is displayed on the display device 210 based on the comparison.

In some other embodiments, the I/O interface 800 may include a Red Green Blue-Depth (RGBD) camera 802. The RGBD camera 802 may be configured to measure a depth map of the hand of the user 110 in front of the RGDB camera 802. In some other cases, the RGDB camera 802 may be attached to a side-wall of the elevator 104. The depth map may be provided as an additional input to the control system 116 for the contactless indication of destination floors in controlling the elevator 104.

Additionally, or alternatively, the I/O interface 800 may include an audio interface 806 (e.g. a speaker) to provide confirmation to the user 110 regarding floor selection. For instance, the audio interface 806 provides an audio confirmation of the selected distance floor, such as 'SECOND FLOOR' to the user 110.

Figure 8B:
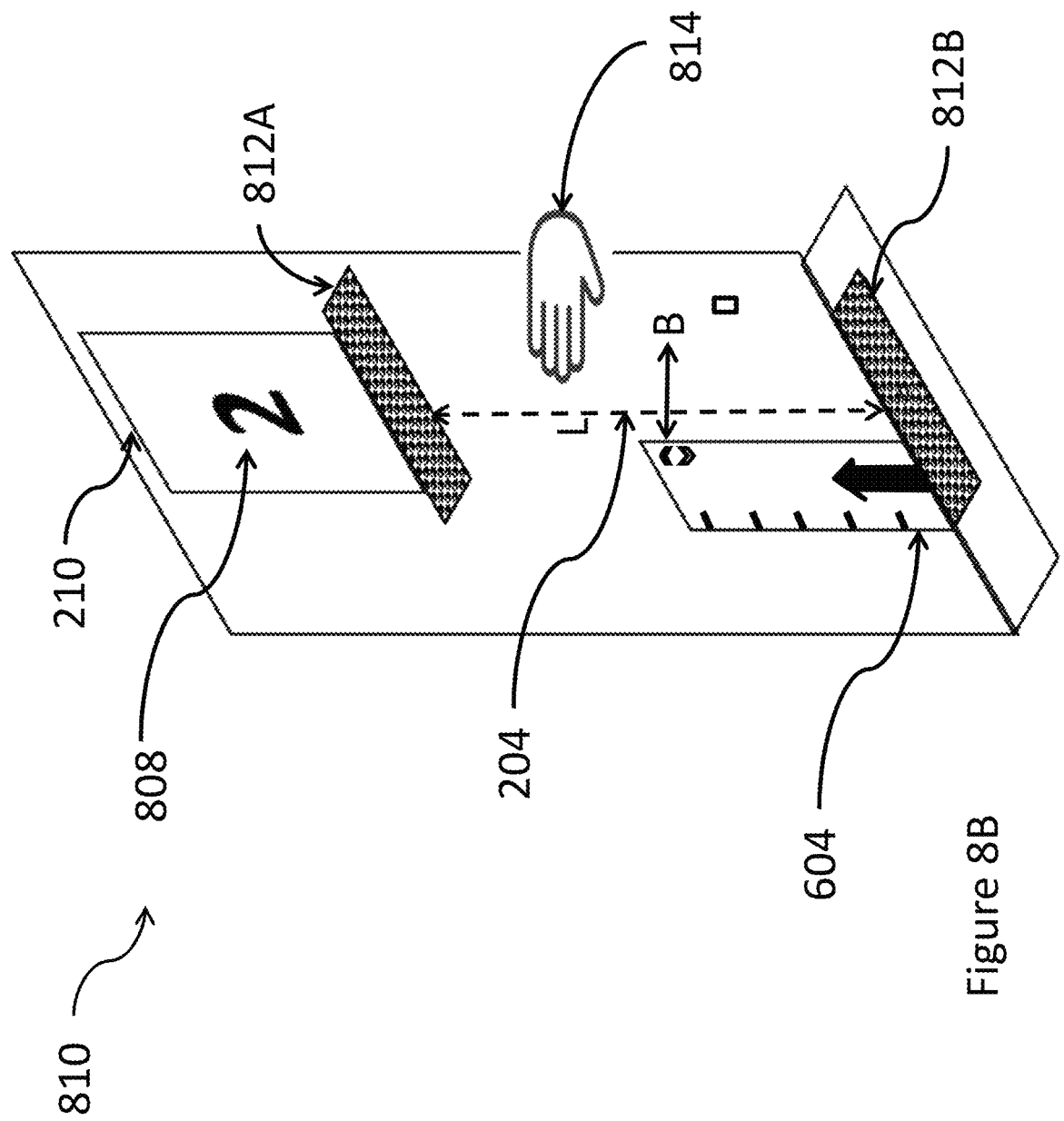
FIG. 8B shows an I/O interface for a distance measurement of hand of the user located in the line-of-sight of a pair of passive infrared (PIR) sensors, according to another example embodiment of the present disclosure.

In some embodiments, the PIR sensor may comprise a pair of PIR sensors 812A and 812B, which is shown and described in FIG. 8B. The pair of sensors can be located on the same or different sides of a hand 814.

FIG. 8B shows an I/O interface 810 for a distance measurement of hand of the user 110 located in the line-of-sight 204 of a pair of PIR sensors 812A and 812B, according to another example embodiment of the present disclosure.

The I/O interface 810 includes a pair of PIR sensors 812A and 812B. The pair of PIR sensors 812A and 812B may be mounted at an angle with respect to each other that is pointing to the hand. In some embodiments, the pair of passive IR sensors 204 may sense distance and state of the hand. When the hand is placed in the line-of-sight 204 of the pair of PIR sensors 812A and 812B, each of the PIR sensors 812A and 812B captures thermal images of the hand at position 814. As shown in FIG. 8B, the PIR sensor 812A captures a thermal image (I1) of the hand and the PIR sensor 812B captures another thermal image (I2) of the hand. In each of the thermal images, the hand is in different positions due to different directions of each of the pair of PIR sensors 812A and 812B.

Further, the processor 118 may determine image pixels that correspond to the hand in the thermal images. In some embodiments, the image pixels corresponding to the hand in both the thermal images may be determined based on a threshold. The threshold may correspond to a temperature, such a temperature of the user 110. The temperature of the user 110 may be determined based on heat radiated of the user 110 captured by the pair of PIR sensors 812A and 812B. The processor 118 may further determine a difference between centroids of the image pixels and compute a difference between the two positions of the hand in the thermal images based on the difference between the centroids. Further, a distance of the hand from the pair of sensors 812A and 812B is computed based on the difference between the two positions of the hand in the thermal images. The computed distance may be compared with a referenced distance at the baseline, B. Accordingly the destination floor 808 may be selected and displayed on the display device 210.

In some embodiments, the difference between the centroids may be considered as the referenced distance (i.e. initially sensed distance) when the user 110 places his hand in front of the pair of PIR sensors 812A and 812B for a first time. In such cases, the referenced distance is not required to be at a fixed position (e.g. baseline B). Further, a change in position of the hand of the user 110 from the pair of PIR sensors 812A and 812B is measured with respect to the referenced distance to measure change from the referenced distance. Based on the measured change from the referenced distance (i.e. the difference between the centroids), the destination floor is selected and displayed on the display device 210.

Figure 9B:
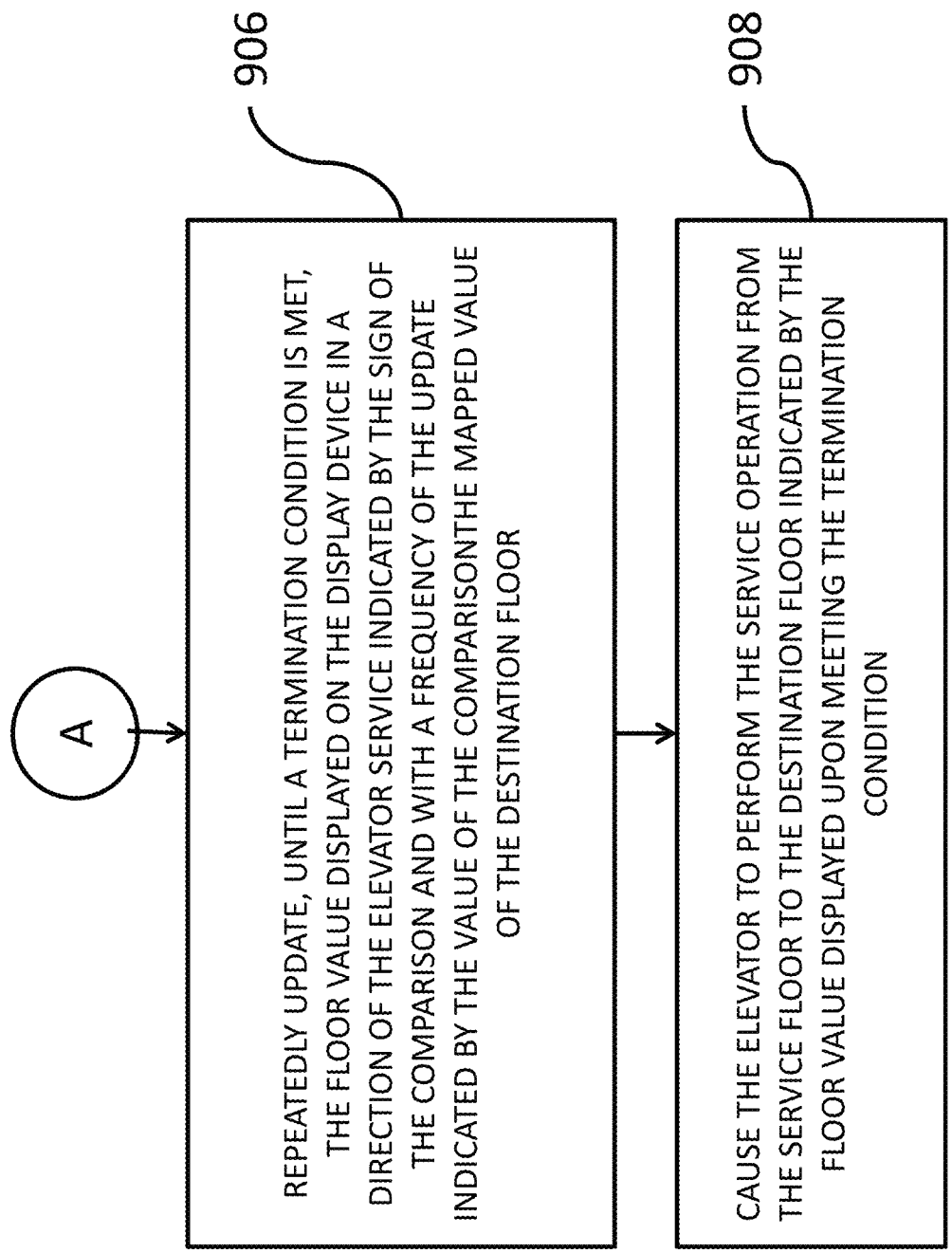
FIG. 9 shows a method flowchart for controlling an operation of an elevator of a building, according to one example embodiment of the present disclosure.

FIG. 9 shows a flow diagram of a method 900 for controlling an operation of an elevator of a building, according to one example embodiment of the present disclosure. The method 900 includes operations 902-908 that are performed by the control system 116 using the processor 118.

At operation 902, a distance to an object located at a service floor in a line-of-sight of a sensor (e.g. the sensor 202). The object may be a hand of a user (e.g. the user 110) in front of the sensor. The sensor may project light and the user may place his hand in front of the sensor in the line-of-sight of the sensor. The sensor may measure the distance to the object based on the light reflected from the hand of the user.

At operation 904, the received distance is compared with a referenced distance to estimate a value of the comparison and a sign associated with the value of the comparison.

At operation 906, a floor value displayed on the display device is repeatedly updated, until a termination condition is met. The floor value is updated in a direction of the elevator service indicated by the sign of the comparison and with a frequency of the update indicated by the value of the comparison. The frequency of update corresponds to increasing or decreasing the floor value by a number (i.e. the value of the comparison) per second. Each floor value is associated with each floor of the building. In some embodiments, the floor values are a sequence of whole numbers.

At operation 908, the elevator is caused to perform the service operation from the service floor to the destination floor indicated by the floor value displayed upon meeting the termination condition. The termination condition is met when the value of the comparison is below a distance threshold for a period of time greater than a threshold time.

Figure 10:
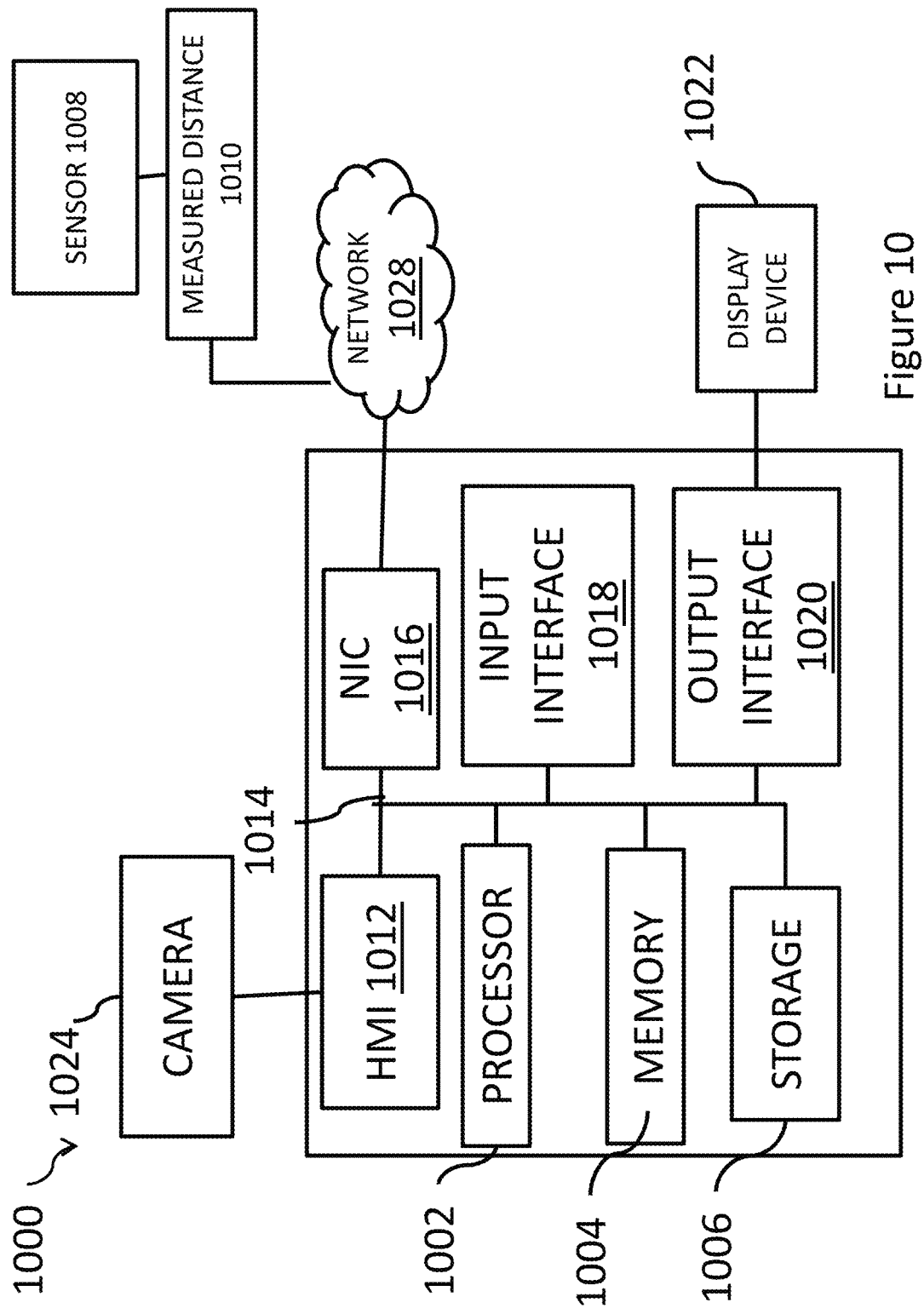
FIG. 10 shows a block diagram of a control system for controlling an operation of an elevator of a building, according to one example embodiment of the present disclosure.

FIG. 10 shows a block diagram of a control system 1000 for controlling an operation of an elevator (e.g. the elevator 104) of a building (e.g. the building 102), according to one example embodiment of the present disclosure. The control system 1000 corresponds to the control system 116 of FIG. 1. The control system 1000 includes a processor 1002, a memory 1004, a storage 1006 and a sensor 1008. The memory 1004 can include random access memory (RAM), read only memory (ROM), flash memory, or any other suitable memory systems.

The processor 1002 can be a single core processor, a multi-core processor, a computing cluster, or any number of other configurations. In some implementations, the control system 1000 may have different types and combination of interfaces, such as human machine interface 1026 for connecting to the camera 1024.

The control system 1000 is configured to provide the contactless indication of the destination floors in the group elevator control using the processor 1002. In some embodiments, the processor 1002 is configured to receive a distance metric to an object located at a service floor in a line-of-sight of a sensor. The processor 1002 is also configured to compare the received distance metric with a referenced distance metric to estimate a sign of the comparison and a value of the comparison. The processor 1002 is also configured to repeatedly update, until a termination condition is met, the floor value displayed on the display device in a direction of the elevator service indicated by the sign of a value of the comparison and with a frequency of the update indicated by the value of the comparison. The processor 1002 is further configured to cause the elevator to perform the service operation from the service floor to the destination floor indicated by the floor value displayed upon meeting the termination condition. The termination condition is met when the value of the comparison is below a distance threshold for a period of time greater than a threshold time.

The sensor 1008 is configured to provide measured distance 1010 of an object (e.g. the hand of the user 110) at a service floor in the building 102. In some embodiments, the sensor 1008 may correspond to the IR sensor, such as a pair of PIR sensors. Additionally, or alternatively, the sensor 1008 may include a camera 1024. The camera 1024 may correspond to an RGBD camera, such as the RGDB camera 802. In one implementation, a human machine interface 1012 within the control system 1000 connects the control system 1000 to the camera 1024. Additionally, or alternatively, a network interface controller (NIC) 1016 can be adapted to connect the control system 1000 through the bus 1014 to the network 1028. Through the network 1028, measured distance 1010 may be downloaded and stored within storage 1006 for further processing. In some cases, the measured distance 1010 may be provided to the processor 1002 via a network 1028. In one implementation, the measured distance 1010 may be received via an input interface 1018 of the control system 1000.

The control system 1000 may also include a display device 1022. The display device 1022 is configured to display floor values indicating a destination floor selected by the user 110. The display device 1022 may be connected with the control system 1000 via an output interface 1020. Additionally, or alternatively, the output interface 1020 may include an audio interface (e.g. the audio interface 806) that may provide an output of a selected destination floor displayed on the display device 1022.

In some example embodiments, the storage 1006 may be configured to direction of elevator service of the elevator 104, signs of comparison between referenced distance and measured distance, values of the comparison, frequency of update of the floor values displayed in the display device 1022, termination condition for the frequency of update, the period of time, distance threshold, and the threshold time or the like.

Figure 11:
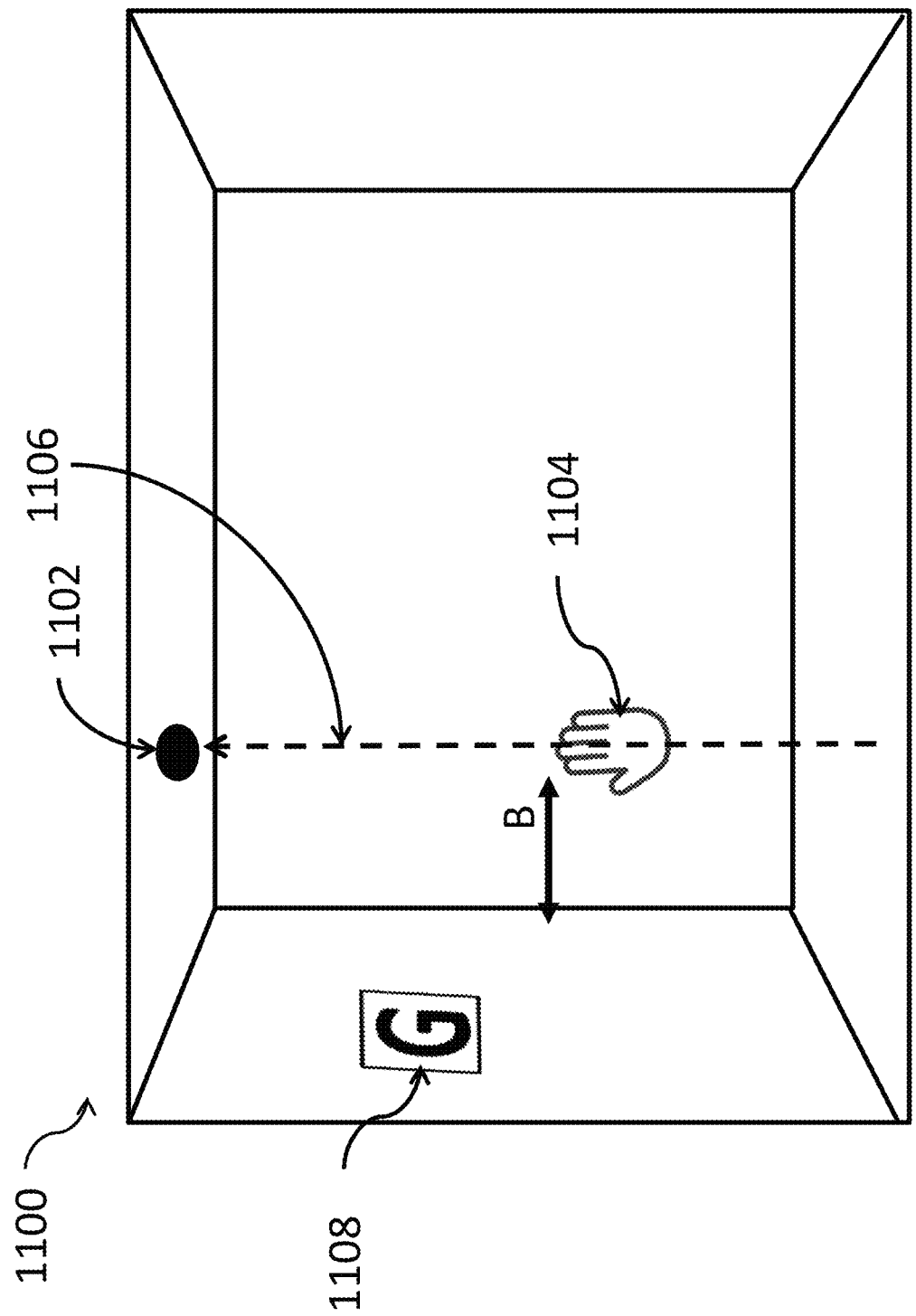
FIG. 11 illustrates a scenario of controlling an operation of an elevator of a building by the control system, according to one example embodiment of the present disclosure.

FIG. 11 illustrates a scenario of controlling an operation of an elevator 1100 of a building by a control system, according to one example embodiment of the present disclosure. As shown in FIG. 11, the elevator 1100 is equipped with a sensor 1102 at a ceiling of the elevator 1100, as shown in FIG. 11. The sensor 1102 corresponds to the sensor 202. In an illustrative example scenario, a user enters the elevator 1100. The user positions an object, such as his hand 1104 in a line-of-sight 1106 of the sensor 1102. The hand 1104 may be moved up or down in the line-of-sight 1106 for providing contactless inputs via the sensor 1102. The sensor 1102 measures a distance to the hand 1104. The measured distance of the hand 1102 is compared against a referenced distance metric. In one example embodiment, the referenced distance metric may correspond to a distance from the sensor 1102 to a baseline B. The user may move his hand 1104 back or forth from the baseline B to provide contactless indication of destination floors for controlling the elevator 1100. When the hand 1104 is at the baseline B, no floor value is displayed on a display device, such as display device 1108. In case the hand 1104 is moved up from the baseline B, the floor value may be increased in a sequential manner. In a case the hand 1104 is moved down from the baseline B, the floor value may be decreased in the sequential manner. Such increment or decrement may be associated with a frequency of update of a floor value that may be displayed in the display device 1108. When the hand 1104 is at the baseline B, there is no change in the frequency of update. In one example, when the hand 1104 moves below the baseline B, a ground floor value is displayed on the display device 1108, as shown in FIG. 11. In this manner, the control system 1000 provides a contactless control of elevators in an efficient and feasible manner.

The invention claimed is:

1. A control system for controlling an operation of an elevator arranged to service different floors of a building, comprising:
    an input interface configured to receive a measurement of a distance metric to an object located at a service floor in a line-of-sight of a sensor;
    an output interface configured to cause a display device to display a floor value indicating a destination floor;
    a processor configured to
        compare the received distance metric with a referenced distance metric to estimate a sign of the comparison and a value of the comparison;
        repeatedly update, until a termination condition is met, the floor value displayed on the display device in a direction of the elevator service indicated by the sign of the comparison and with a frequency of the update indicated by the value of the comparison; and cause the elevator to perform the service operation from the service floor to the destination floor indicated by the floor value displayed upon meeting the termination condition, wherein the processor causes the display device to display a street floor when the sign of comparison is negative and the value of comparison is above a predetermined threshold, and wherein the processor causes the display device to display a penthouse floor when the sign of comparison is positive and the value of comparison is above the predetermined threshold.

2. The control system of claim 1,
wherein the direction of the elevator service is in upward direction of the building starting from the service floor when the received distance metric is greater than the referenced distance metric making the sign of comparison positive, and
wherein the direction of the elevator service is in downward direction of the building starting from the service floor when the received distance metric is smaller than the referenced distance metric making the sign of comparison negative.

3. The control system of claim 1, wherein each update changes the displayed floor value in the direction of the elevator service, wherein the frequency of the update is proportional to the value of the comparison, such that a greater value of the comparison increases the frequency of the update with respect to a lower value of the comparison, and wherein the frequency of the update is zero when the value of the comparison is below a distance threshold.

4. The control system of claim 1, wherein the termination condition is met when the value of the comparison indicated by a difference between the received distance metric and the referenced distance metric is below a distance threshold for a period of time greater than a time threshold.

5. The control system of claim 1, wherein floor values associated with the floors of the building are a sequence of whole numbers, and wherein smaller values of distance metric values correspond to lower floor values of the floor values, and wherein the display device increases or decreases the numbers sequentially upon the update.

6. The control system of claim 5, wherein the line-of-sight of the sensor is in a vertical direction allowing the user to change the destination floor by moving the hand up or down, wherein the referenced distance metric corresponds to a predetermined position of the hand above or below the sensor.

7. The control system of claim 1, wherein the object is a hand of a user detected by the sensor arranged at the service floor or at the elevator stopped at the service floor allowing the user to change the destination floor by moving the hand within the line-of-sight of the sensor.

8. The control system of claim 7, wherein the line-of-sight of the sensor is in a vertical direction allowing the user to change the destination floor by moving the hand up or down, or wherein the line-of-sight of the sensor is in a horizontal direction allowing the user to change the destination floor by moving the hand backward or forward, or combination thereof.

9. The control system of claim 7, wherein the referenced distance metric is an initial distance to the hand detected by the sensor allowing the user to change the destination floor by moving the hand within the line-of-sight of the sensor with respect to the initial position of the hand.

10. The control system of claim 9, wherein the processor is causing the display device to display the service floor upon receiving the initial distance to the hand.

11. The control system of claim 1, wherein the sensor includes an infrared (IR) sensor.

12. The control system of claim 11, wherein the IR sensor is a passive IR (PIR) sensor configured to measure radiant heat emitted from the object.

13. The control system of claim 12,
wherein the PIR sensor comprises a pair of passive PIR sensors, and
wherein each of the pair PIR sensors is configured to capture thermal images of the object.

14. The control system of claim 1, wherein the sensor includes a Red Green Blue-Depth (RGBD) camera that measures a depth map of the object in front of the RGBD camera.

15. A method for controlling an operation of an elevator arranged to service passengers to different floors of a building, wherein the method uses a processor coupled with stored instructions implementing the method, wherein the instructions, when executed by the processor carry out steps of the method, comprising:
receiving a measurement of a distance metric to an object located at a service floor in a line-of-sight of a sensor;
comparing the received distance metric with a referenced distance metric to estimate a sign of the comparison and a value of the comparison;
repeatedly updating, until a termination condition is met, the floor value displayed on the display device in a direction of the elevator service indicated by the sign of the comparison and with a frequency of the update indicated by the value of the comparison;
causing the elevator to perform the service operation from the service floor to the destination floor indicated by the floor value displayed upon meeting the termination condition;
causing the display device to display a street floor when the sign of comparison is negative and the value of comparison is above a predetermined threshold; and
causing the display device to display a penthouse floor when the sign of comparison is positive and the value of comparison is above the predetermined threshold.

16. The method of claim 15, further comprising:
determining the direction of the elevator service is in upward direction of the building starting from the service floor when the received distance metric is greater than the referenced distance metric making the sign of comparison positive, and
determining the direction of the elevator service is in downward direction of the building starting from the service floor when the received distance metric is smaller than the referenced distance metric making the sign of comparison negative.

17. The method of claim 15, further comprising changing the displayed number floor value in the direction of the elevator service based on each update.

18. The method of claim 15, further comprising checking the termination condition when the value of the comparison indicated by a difference between the received distance metric and the referenced distance metric is below a distance threshold for a period of time greater than a time threshold.

19. A control system for controlling an operation of an elevator arranged to service different floors of a building, comprising:
an input interface configured to receive a measurement of a distance metric to an object located at a service floor in a line-of-sight of a sensor, wherein the sensor includes an infrared (IR) sensor, wherein the IR sensor is a passive IR (PIR) sensor configured to measure radiant heat emitted from the object, wherein the PIR sensor comprises a pair of passive PIR sensors, and wherein each of the pair PIR sensors is configured to capture thermal images of the object;

an output interface configured to cause a display device to display a floor value indicating a destination floor;

a processor configured to
- compare the received distance metric with a referenced distance metric to estimate a sign of the comparison and a value of the comparison;
- repeatedly update, until a termination condition is met, the floor value displayed on the display device in a direction of the elevator service indicated by the sign of the comparison and with a frequency of the update indicated by the value of the comparison; and cause the elevator to perform the service operation from the service floor to the destination floor indicated by the floor value displayed upon meeting the termination condition, wherein the processor is further configured to:

compute respective position of the object in the thermal images as centroid of image pixels having values that are above a predefined threshold;

compute distance to the object based on the difference between the respective positions of the object in the thermal images; and select the destination floor based on the computed distance.

* * * * *